US009623870B2

(12) United States Patent
Kuroki et al.

(10) Patent No.: US 9,623,870 B2
(45) Date of Patent: Apr. 18, 2017

(54) VEHICLE TRAVEL CONTROL DEVICE

(71) Applicants: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/439,384

(22) PCT Filed: Oct. 31, 2012

(86) PCT No.: PCT/JP2012/078230
§ 371 (c)(1),
(2) Date: Apr. 29, 2015

(87) PCT Pub. No.: WO2014/068722
PCT Pub. Date: May 8, 2014

(65) Prior Publication Data
US 2015/0307103 A1  Oct. 29, 2015

(51) Int. Cl.
*B60W 30/18* (2012.01)
*B60W 30/182* (2012.01)
(Continued)

(52) U.S. Cl.
CPC ....... *B60W 30/18109* (2013.01); *B60T 7/042* (2013.01); *B60T 7/22* (2013.01);
(Continued)

(58) Field of Classification Search
CPC ..................................................... B60T 13/52
See application file for complete search history.

(56) References Cited

U.S. PATENT DOCUMENTS 5,961,418 A    10/1999  Taniguchi et al.
6,412,455 B1 *  7/2002  Ogiso ..................... B60T 13/52
                                                        123/399

(Continued)

FOREIGN PATENT DOCUMENTS

CN    104487299 A    4/2015
CN    104755341 A    7/2015
(Continued)

OTHER PUBLICATIONS

International Search Report issued Nov. 27, 2012, in PCT/JP2012/078230, filed Oct. 31, 2012.
(Continued)

*Primary Examiner* — Todd Melton
*Assistant Examiner* — Jason Roberson
(74) *Attorney, Agent, or Firm* — Oblon, McClelland, Maier & Neustadt, L.L.P.

(57) ABSTRACT

A running control device of a vehicle includes an engine and a brake booster amplifying a brake force by forming a negative pressure in a negative pressure tank by rotation of the engine. The running control device is configured to execute an engine brake running mode performed with the
(Continued)

engine coupled to wheels such that an engine brake is applied by driven rotation of the engine and an inertia running mode performed with an engine brake force made lower than that of the engine brake running mode. The running control device executes a first inertia running mode performed with the rotation of the engine stopped and a second inertia running mode performed with the engine kept rotating as the inertia running mode in accordance with predefined respective execution conditions. The running control device comprises a prediction portion configured to predict a necessity of the negative pressure.

7 Claims, 15 Drawing Sheets

(51) Int. Cl.
| | | |
|---|---|---|
| B60W 10/184 | (2012.01) | |
| B60W 10/06 | (2006.01) | |
| B60T 7/22 | (2006.01) | |
| B60T 13/52 | (2006.01) | |
| F16H 61/21 | (2006.01) | |
| F16D 48/02 | (2006.01) | |
| B60T 13/00 | (2006.01) | |
| B60W 10/10 | (2012.01) | |
| B60T 7/04 | (2006.01) | |
| B60T 17/02 | (2006.01) | |

(52) U.S. Cl.
CPC .............. *B60T 13/00* (2013.01); *B60T 13/52* (2013.01); *B60T 17/02* (2013.01); *B60W 10/06* (2013.01); *B60W 10/10* (2013.01); *B60W 10/184* (2013.01); *B60W 30/182* (2013.01); *B60W 30/18072* (2013.01); *F16D 48/02* (2013.01); *F16H 61/21* (2013.01); *B60T 2201/022* (2013.01); *B60W 2030/1809* (2013.01); *B60W 2550/308* (2013.01); *B60W 2710/182* (2013.01)

(56) References Cited

U.S. PATENT DOCUMENTS

| | | | |
|---|---|---|---|
| 8,394,001 | B2 | 3/2013 | Tsutsui et al. |
| 2007/0102208 | A1 | 5/2007 | Okuda et al. |
| 2011/0245005 | A1 | 10/2011 | Tsutsui et al. |
| 2011/0270501 | A1* | 11/2011 | Ito ...................... F02N 11/0833 701/70 |
| 2012/0010047 | A1 | 1/2012 | Strengert et al. |
| 2012/0065860 | A1* | 3/2012 | Isaji ........................ B60T 13/52 701/70 |
| 2015/0006045 | A1 | 1/2015 | Motozono et al. |
| 2015/0149058 | A1 | 5/2015 | Kim et al. |
| 2015/0166065 | A1 | 6/2015 | Kuroki et al. |
| 2015/0191172 | A1 | 7/2015 | Kim |
| 2015/0274168 | A1 | 10/2015 | Kuroki et al. |
| 2015/0291171 | A1 | 10/2015 | Kuroki et al. |
| 2016/0084376 | A1 | 3/2016 | Kim et al. |

FOREIGN PATENT DOCUMENTS

| | | |
|---|---|---|
| JP | H10-181388 | 7/1998 |
| JP | 2002-227885 A | 8/2002 |
| JP | 2005-226701 | 8/2005 |
| JP | 2011-173475 A | 9/2011 |
| WO | WO 2011/135725 A1 | 11/2011 |
| WO | WO 2014/064524 A1 | 5/2014 |

OTHER PUBLICATIONS

Office Action issued in U.S. Appl. No. 14/414,593 on Apr. 8, 2016.
Notice of Allowance issued Nov. 10, 2016, in co-pending U.S. Appl. No. 14/414,593.

* cited by examiner

| RUNNING MODE | ENGINE 12 | CLUCH C1 | ENGINE BRAKE FORCE | NEGATIVE PRESSURE SUPPLY |
|---|---|---|---|---|
| ENGINE BRAKE RUNNING | F/C; DRIVEN ROTATION | ENGAGED | LARGE | PRESENT |
| FREE-RUN INERTIA RUNNING | F/C; ROTATION STOP | RELEASED | SMALL | ABSENT |
| NEUTRAL INERTIA RUNNING | IDLE ROTATION | RELEASED | SMALL | PRESENT |

FIG.18

| RUNNING MODE | ENGINE 12 | CLUCH C1 | ENGINE BRAKE FORCE | NEGATIVE PRESSURE SUPPLY |
|---|---|---|---|---|
| ENGINE BRAKE RUNNING | F/C; DRIVEN ROTATION | ENGAGED | LARGE | PRESENT |
| FREE-RUN INERTIA RUNNING | F/C; ROTATION STOP | RELEASED | SMALL | ABSENT |
| CYLINDER RESTING INERTIA RUNNING | F/C; DRIVEN ROTATION | ENGAGED | MEDIUM | PRESENT |

VEHICLE TRAVEL CONTROL DEVICE

TECHNICAL FIELD

The present invention relates to a running control device of a vehicle and particularly to a technique of further improving fuel consumption while ensuring an amplification effect on a brake force at the time of a brake operation in a vehicle configured to execute an inertia running mode performed with an engine brake force made lower than that of an engine brake running mode.

BACKGROUND ART

With regard to an engine brake running mode performed with engine brake applied by driven rotation of an engine while the engine is coupled to wheels, an inertia running mode performed with an engine brake force made lower than that of the engine brake running mode is conceived for extending a running distance and improving fuel consumption. A device described in Patent Document 1 is an example thereof and, two types of control modes are proposed as (a) a first inertia running mode performed with rotation of the engine stopped and (b) a second inertia running mode performed with the engine kept rotating. Specifically, the first inertia running mode is a free-run inertia running mode in which a clutch is released to separate the engine from the wheels while fuel supply to the engine is stopped to stop rotation, and the second inertia running mode is a neutral inertia running mode in which fuel is supplied to operate the engine while a clutch is released to separate the engine from the wheels. The inertia running mode is performed in either mode without particular distinction under certain conditions.

PRIOR ART DOCUMENT

Patent Document

Patent Document 1: Japanese Laid-Open Patent Publication No. 2002-227885

SUMMARY OF THE INVENTION

Problem to be Solved by the Invention

In the Patent Document 1, in the case of an operating state in which it is considered that a vehicle braking force is highly likely to be required, such as when an inter-vehicle distance to a preceding vehicle is equal to or less than a predetermined value or when a vehicle is on a downslope, the control mode of the inertia running mode is canceled and the execution thereof is prohibited without distinction between the two types of the inertia running modes. However, brake performance is different between the first inertia running mode and the second inertia running mode associated with different engine states. Nevertheless, since the first inertia running mode and the second inertia running mode are executed without distinction, the technique of Patent Document 1 has room for improvement in achieving an improvement in fuel consumption while ensuring a braking force at the time of a brake operation.

In particular, although a vehicle generally includes a brake booster amplifying a brake force by forming a negative pressure in a negative pressure tank by a pumping action associated with rotation of the engine, the negative pressure tank cannot be charged with a negative pressure in the first inertia running mode since the rotation of the engine is stopped, resulting in a reduction in an amplification effect on a brake force due to repeated operations of the brake, while the negative pressure tank is successively charged with a negative pressure in the second inertia running mode since the engine is kept rotating and, therefore, the amplification effect on the brake force is continuously acquired. If an execution condition is defined in accordance with one of the characteristics regardless of the difference in a characteristic of the brake performance, this leads to a problem that a fuel consumption improvement effect is restrained although the amplification effect on the brake force can be ensured, or that the amplification effect on the brake force is reduced although fuel consumption is improved.

The present invention was conceived in view of the situations and it is therefore an object of the present invention to further improve fuel consumption while ensuring an amplification effect on a brake force at the time of a brake operation in a vehicle configured to execute an inertia running mode performed with an engine brake force made lower than that of an engine brake running mode.

Means for Solving the Problem

To achieve the object, the first aspect of the invention provides (a) a running control device of a vehicle including an engine and a brake booster amplifying a brake force by forming a negative pressure in a negative pressure tank by rotation of the engine, (b) the running control device of a vehicle being configured to execute an engine brake running mode performed with the engine coupled to wheels such that an engine brake is applied by driven rotation of the engine and an inertia running mode performed with an engine brake force made lower than that of the engine brake running mode, (c) the running control device of a vehicle executing a first inertia running mode performed with the rotation of the engine stopped and a second inertia running mode performed with the engine kept rotating as the inertia running mode in accordance with predefined respective execution conditions, (d) the running control device of a vehicle comprising a prediction portion configured to predict a necessity of the negative pressure, the necessity of the negative pressure being included in a condition for starting of each of the first inertia running mode and the second inertia running mode, (e) the first inertia running mode being started on the condition that the necessity of the negative pressure is equal to or less than a predefined first determination value, the second inertia running mode being started when the necessity of the negative pressure is equal to or less than a predefined second determination value higher than the first determination value, and the engine brake running mode being executed when the necessity of the negative pressure is larger than the second determination value.

The necessity of the negative pressure means a possibility that the amplification effect on a brake force by a negative pressure is required, and can be replaced with a possibility that an operation of a brake operation member such as a brake pedal (brake operation) is performed or a possibility that a vehicle braking force equal to or greater than a predetermined value is required by the brake operation.

The second aspect of the invention provides the running control device of a vehicle recited in the first aspect of the invention, wherein the prediction portion predicts the necessity of the negative pressure based on at least one of an inter-vehicle distance to a preceding vehicle, a road gradient, and a vehicle speed such that the necessity of the negative pressure is higher when the inter-vehicle distance is shorter, such that the necessity of the negative pressure is higher when the down-slope of the road surface is larger, and such that the necessity of the negative pressure is higher when the vehicle speed is higher.

The third aspect of the invention provides the running control device of a vehicle recited in the first or second aspect of the invention, wherein the second inertia running mode is started when the necessity of the negative pressure is in a region exceeding the first determination value and equal to or less than the second determination value.

The fourth aspect of the invention provides the running control device of a vehicle recited in the first or second aspect of the invention, wherein (a) the second inertia running mode is started when the necessity of the negative pressure is in a region equal to or less than the second determination value including a region equal to or less than the first determination value, and wherein (b) one of the first inertia running mode and the second inertia running mode is selected to start thereof in an overlapping region equal to or less than the first determination value.

The fifth aspect of the invention provides the running control device of a vehicle recited in any one of the first to fourth aspects of the invention, wherein (a) the first inertia running mode is a free-run inertia running mode in which the engine is separated from the wheels with fuel supply to the engine stopped to stop rotation of the engine, and wherein (b) the second inertia running mode is a neutral inertia running mode in which fuel is supplied to operate the engine while the engine is separated from the wheels.

In the neutral inertia running mode, although the engine is operated by supplying fuel and therefore, this deteriorates the fuel consumption as compared to the free-run inertia running mode, since the engine is disconnected from the wheels, the engine brake force is substantially zero, the distance of the inertia running mode becomes longer and a frequency of reacceleration is reduced and thus, overall fuel consumption can be improved as compared to the engine brake running mode.

The sixth aspect of the invention provides the running control device of a vehicle recited in any one of the first to fourth aspects of the invention, wherein (a) the first inertia running mode is a free-run inertia running mode in which the engine is separated from the wheels with fuel supply to the engine stopped to stop rotation of the engine, and wherein (b) the second inertia running mode is a cylinder resting inertia running mode in which fuel supply to the engine is stopped with the engine coupled to the wheels while operation of a piston and intake/exhaust valves of at least one of multiple cylinders of the engine is stopped.

In the cylinder resting inertia running mode, although the crankshaft is driven to rotate depending on the vehicle speed etc., the engine brake force is reduced by only a portion without a loss (rotation resistance) due to a pumping action when the piston is stopped. Also when the intake/exhaust valves are stopped in the closed valve state or the opened valve state, a loss due to a pumping action becomes smaller as compared to the case of opening/closing in synchronization with the crankshaft, and the engine brake force is reduced.

In the sixth aspect of the invention, since only some of the multiple cylinders of the engine are rested and the remaining cylinders are opened and closed in synchronization with the crankshaft, the negative pressure is supplied to the brake booster due to the pumping action of these cylinders and the brake force can be amplified.

Effects of the Invention

In a running state associated with a low necessity of the amplification effect on the brake force by the brake booster that is, when the necessity of the negative pressure is equal to or less than the first determination value, the first inertia running mode is performed with the rotation of the engine stopped without generating the negative pressure and, therefore, the engine brake force is significantly reduced so that the running distance of the inertia running mode is significantly extended, leading to acquisition of an excellent fuel consumption improvement effect.

On the other hand, the execution of the second inertia running mode performed with the engine kept rotating to acquire the amplification effect on the brake force by the brake booster is started when the necessity of the negative pressure is equal to or less than the second determination value higher than the first determination value, and therefore, as compared to the case of uniformly prohibiting the inertia running mode at the first determination value or larger, the fuel consumption can be improved while ensuring the amplification effect on the brake force at the time of brake operation.

As described above, the overall fuel consumption can further be improved while properly ensuring the amplification effect on the brake force at the time of brake operation.

Since the engine brake running mode is performed when the necessity of the negative pressure is larger than the second determination value, the amplification effect on the brake force by the brake booster is properly acquired, leading to the acquisition of the large engine brake force, and therefore, the fuel consumption can be improved while properly ensuring the large vehicle braking force including the amplification effect on the brake force depending on the necessity of the negative pressure.

The second aspect of the invention is the case that the necessity of the negative pressure is predicted based on at least one of an inter-vehicle distance to a preceding vehicle, a road gradient, and a vehicle speed such that the necessity of the negative pressure is higher when the inter-vehicle distance is shorter, such that the necessity of the negative pressure is higher when the down-gradient of the road surface is larger, and such that the necessity of the negative pressure is higher when the vehicle speed is higher. The fuel consumption can be improved while properly ensuring the amplification effect on the brake force at the time of brake operation since the first inertia running mode and the second inertia running mode are performed depending on the necessity of the negative pressure.

In the third aspect of the invention, since the first inertia running mode is started when the necessity of the negative pressure is equal to or less than the first determination value and the second inertia running mode is started when the necessity of the negative pressure exceeds the first determination value and is equal to or less than the second determination value, the fuel consumption can be improved while ensuring the amplification effect on the brake force at the time of brake operation depending on the necessity of the negative pressure.

In the fourth aspect of the invention, since the second inertia running mode is started when the necessity of the negative pressure is in a region equal to or less than the second determination value including a region equal to or less than the first determination value, and one of the first inertia running mode and the second inertia running mode is selected to start thereof in an overlapping region equal to or less than the first determination value, the fuel consumption can be improved while ensuring the amplification effect on the brake force at the time of brake operation by properly selecting a type of the inertia running mode depending on the running state and the vehicle state.

While the fifth aspect of the invention is the case that the free-run inertia running mode is performed as the first inertia running mode and the neutral inertia running mode is performed as the second inertia running mode, the sixth aspect of the invention is the case that the free-run inertia running mode is performed as the first inertia running mode and the cylinder resting inertia running mode is performed as the second inertia running mode. In both of the cases, the engine brake force is made smaller as compared to the engine brake running mode and a running distance of the inertia running mode becomes longer, resulting in improvement in fuel consumption.

BRIEF DESCRIPTION OF THE DRAWINGS

FIG. 18 is a diagram for explaining further another example of the present invention and a diagram for explaining three kinds of running modes when the cylinder resting inertia running mode is performed instead of the neutral inertia running mode.

MODE FOR CARRYING OUT THE INVENTION

Figure 1:
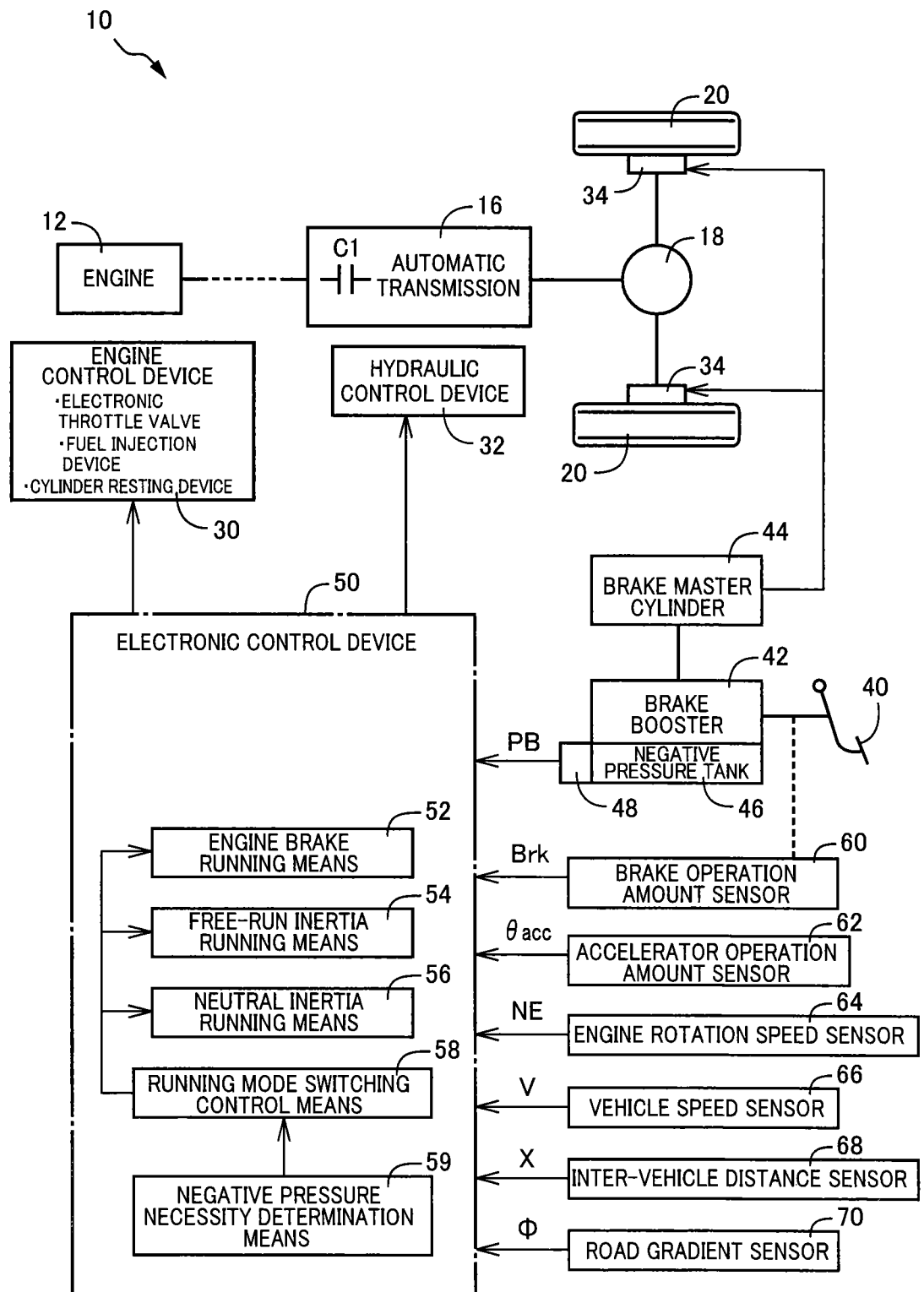
FIG. 1 is a schematic configuration diagram including a schematic of a vehicle drive device to which the present invention is preferably applied along with a main portion of a control system.

Although the present invention is applied to a vehicle including at least an engine as a drive force source and is preferably applied to an engine drive vehicle, the present invention is also applicable to a hybrid vehicle including an electric motor or a motor generator as a drive force source in addition to the engine. The engine may be an internal combustion engine generating power from combustion of fuel. A connecting/disconnecting device is disposed between the engine and wheels to connect and disconnect between them such that the engine can be separated from the wheels. Although the connecting/disconnecting device is preferably implemented by using a hydraulic friction type clutch or brake, connecting/disconnecting devices of various types can be employed, including electrically controlling a reaction force to connect and disconnect the power transmission. An automatic transmission including pluralities of clutches and brakes and capable of being neutral is also usable.

In the engine brake running mode, all the cylinders of the engine are driven to rotate so as to generate an engine brake force from a rotation resistance such as a pumping loss and a friction torque, and the engine may be in a fuel cut (F/C) state in which fuel supply is stopped or may be in an operating state such as an idling state in which a predetermined amount of fuel is supplied. Even in the case of the idling state, the engine brake force is generated from the driven rotation at a rotation speed corresponding to a vehicle speed etc.

The first inertia running mode is, for example, an free-run inertia running mode in which the engine is separated from the wheels by the connecting/disconnecting device while the fuel supply to the engine is stopped to stop the engine rotation. The second inertia running mode is, for example, a neutral inertia running mode in which fuel is supplied to operate (perform self-sustaining rotation) the engine while the engine is separated from the wheels by the connecting/disconnecting device, or a cylinder resting inertia running mode in which the fuel supply to the engine is stopped with the engine coupled to the wheels by the connecting/disconnecting device while operation of at least one of a piston and intake/exhaust valves is stopped in some of multiple cylinders. In the neutral inertia running mode, the engine is desirably operated in the idle state with substantially the minimum supply amount of fuel, for example; however, the engine may be operated in a state other than the idle state. The pistons and the intake/exhaust valves can mechanically be stopped in the cylinder resting inertia running mode by disconnecting a clutch mechanism disposed between a crankshaft and the respective pistons and the intake/exhaust valves, for example. With regard to the intake/exhaust valves, for example, if intake/exhaust valves of electromagnetic type etc. are used that can be controlled to open/close independently of the rotation of the crankshaft, the operation thereof may be stopped. Although appropriate stop positions of the intake/exhaust valves are positions where all the intake/exhaust valves are in a closed valve state, the stop positions are defined as needed, including stopping at positions where all the valves are in an opened valve state. Even when both the neutral inertia running mode and the cylinder resting inertia running mode are performed as the second inertia running mode in individual cases, the present invention is applicable. In this case, a common valve or different respective values may be set as the second determination values.

The second inertia running mode is performed with the engine kept rotating and an engine brake force reduced as compared to that of the engine brake running mode and can supply a negative pressure to the brake booster from the rotation of the engine. Therefore, the cylinder resting inertia running mode is configured such that some of the multiple cylinders are rested while the other cylinders have the pistons and the intake/exhaust valves operated in synchronization with the rotation of the crankshaft. For example, in the case of an eight-cylinder engine, only half of the cylinders, i.e., four cylinders, are rested while the remaining four cylinders are operated, or only six cylinders are rested while the remaining two cylinders are operated. If the inertia running mode is performed with all the cylinders rested, the amplification effect on the brake force by the brake booster is reduced and, therefore, as is the case with the first inertia running mode, the execution is desirably started in a relatively small negative pressure necessity region such as the first determination value.

The present invention is related to an execution start determination of the first inertia running mode and the second inertia running mode and, although the necessity of the negative pressure is included as the start condition, a condition other than the necessity of the negative pressure is defined as needed so as not to overlap or contradict the determination of the necessity of the negative pressure, including, for example, that an output request amount such as an accelerator operation amount is zero (accelerator-off), that a brake request amount such as a brake operation amount is zero (brake-off), that a down-gradient of a road surface is equal to or less than a predetermined value, that a vehicle speed is equal to or less than a predetermined value, and that an inter-vehicle distance to a preceding vehicle is equal to or greater than a predetermined value. If the negative pressure in the negative pressure tank of the brake booster (brake negative pressure) is equal to or less than a predetermined value, the amplification effect on the brake force cannot be acquired and, therefore, it can be arranged that the second inertia running mode is performed even at less than the first determination value.

Termination conditions for terminating the execution of the first inertia running mode and the second inertia running mode are defined as needed. For example, although the execution may be terminated when the execution start condition is no longer satisfied, a termination condition different from the start condition of executing may also be defined and, for example, even if the output request amount or the brake request amount is changed from OFF to ON due to a depressing operation of the accelerator pedal or the brake pedal, the first inertia running mode or the second inertia running mode may be continued until the request amount becomes equal to or greater than a predetermined value. The necessity of the negative pressure may be set to different values for the execution start condition and the termination condition or a condition related to the necessity of the negative pressure may not be included as the termination condition.

The first determination value may be defined in advance as a constant value or can be defined in various forms such as setting depending on a road gradient to a higher value on an up-slope and a lower value on a down-slope, for example. The second determination value may also be a constant value or may be made variable by using a running state or a vehicle state as a parameter. The variable setting may vary the first determination value and the second determination value continuously or in stages including two stages, and is defined in advance from a data map, a computing equation, etc.

The second aspect of the invention includes predicting the necessity of the negative pressure based on at least one of the inter-vehicle distance to the preceding vehicle, the road gradient, and the vehicle speed and is configured such that the execution of the first inertia running mode or the second inertia running mode is started by using only one of these parameters based on whether the necessity of the negative pressure is equal to or less than the first determination value. Alternatively, the respective necessities of the negative pressure may be predicted based on the three parameters so as to start the execution of the first inertia running mode if all are equal to or less than the first determination value and start the execution of the second inertia running mode if any one exceeds the first determination value. The necessity of the negative pressure may comprehensively be predicted from fuzzy inference etc. by using two or more of the three parameters so as to selectively use the first inertia running mode and the second inertia running mode based on whether the necessity of the negative pressure is equal to or less than the first determination value, or other various forms are also available. In the implementation of the first aspect of the invention, a parameter other than the inter-vehicle distance to the preceding vehicle, the road gradient, and the vehicle speed may be used for predicting the necessity of the negative pressure, i.e., a possibility of performing a brake operation etc.

EXAMPLE

An example of the present invention will now be described in detail with reference to the drawings.

FIG. 1 is a schematic configuration diagram including a schematic of a vehicle drive device 10 to which the present invention is preferably applied along with a main portion of a control system. The vehicle drive device 10 includes as a drive force source an engine 12 that is an internal combustion engine such as a gasoline engine and a diesel engine generating power from combustion of fuel, and the output of the engine 12 is transmitted from an automatic transmission 16 via a differential gear device 18 to left and right wheels 20. A damper device and a power transmission device such as a torque converter are disposed between the engine 12 and the automatic transmission 16, and a motor generator acting as a drive force source can also be disposed therebetween.

The engine 12 includes an engine control device 30 having various pieces of equipment necessary for output control of the engine 12, such as an electronic throttle valve and a fuel injection device, and a cylinder resting device. The electronic throttle valve and the fuel injection device control an intake air amount and a fuel supply amount, respectively, and are basically controlled depending on an operation amount of an accelerator pedal (an accelerator operation amount) θacc that is an output request amount of a driver. The fuel injection device can stop the fuel supply (perform a fuel cut F/C) at the time of acceleration-off when the accelerator operation amount θacc is zero even during running of the vehicle. The cylinder resting device can mechanically separate intake/exhaust valves of some or all of multiple cylinders, for example, eight cylinders, from a crankshaft by a clutch mechanism etc. to stop the valves and, for example, all the intake/exhaust valves are stopped at positions where the valves are in a closed valve state. As a result, since a pumping loss is reduced when the engine 12 is driven to rotate in the fuel cut state, an engine brake force is reduced and a running distance of an inertia running mode can be extended. Pistons may be separated from the crankshaft and stopped instead of stopping the intake/exhaust valves.

The automatic transmission 16 is a stepped automatic transmission of a planetary gear type etc., having a plurality of gear stages with different gear ratios e established depending on engaged/released states of a plurality of hydraulic friction engagement devices (clutches and brakes) and is subjected to shift control by electromagnetic hydraulic control valves, switching valves, etc. disposed in a hydraulic control device 32. A clutch C1 acts as an input clutch of the automatic transmission 16 and is also subjected to engagement/release control by the hydraulic control device 32. The clutch C1 corresponds to a connecting/disconnecting device connecting and disconnecting the engine 12 and the wheels 20. The automatic transmission 16 may be implemented by using a continuously variable transmission of a belt type etc., instead of a stepped transmission.

The wheels 20 include wheel brakes 34 and a braking force is generated depending on a brake operation force (stepping force) Brk of a brake pedal 40 subjected to a stepping operation by a driver. The brake operation force Brk corresponds to a brake request amount and, in this example, a brake oil pressure is generated from a brake master cylinder 44 mechanically via a brake booster 42 depending on the brake operation force Brk so that the braking force is generated by the brake oil pressure. The brake booster 42 amplifies the brake operation force Brk by forming a negative pressure in a negative pressure tank 46 by a pumping action associated with rotation of the engine 12, and the brake oil pressure output from the brake master cylinder 44 is amplified such that a large braking force is acquired. The brake pedal 40 corresponds to a brake operation member.

The vehicle drive device 10 configured as described above includes an electronic control device 50. The electronic control device 50 includes a so-called microcomputer having a CPU, a ROM, a RAM, an I/O interface, etc., to execute signal processes in accordance with a program stored in advance in the ROM, while utilizing a temporary storage function of the RAM. The electronic control device 50 is supplied with a signal indicative of the brake operation force Brk from a brake operation amount sensor 60 and is supplied with a signal indicative of a negative pressure (brake negative pressure) PB in the negative pressure tank 46 of the brake booster 42 from a brake negative pressure sensor 48. The electronic control device 50 is also supplied with a signal indicative of the accelerator operation amount θacc from an accelerator operation amount sensor 62, a signal indicative of a rotation speed (engine rotation speed) NE of the engine 12 from an engine rotation speed sensor 64, a signal indicative of a vehicle speed V from a vehicle speed sensor 66, a signal indicative of an inter-vehicle distance X to a preceding vehicle from an inter-vehicle distance sensor 68, and a signal indicative of a road gradient Φ from a road gradient sensor 70. Other various pieces of information necessary for various controls are also supplied. The inter-vehicle distance sensor 68 is a radar etc., and the road gradient sensor 70 is a G (acceleration) sensor etc. The road gradient Φ can also be obtained by a calculation from the output of the engine 12 and a change in the vehicle speed V.

The electronic control device 50 functionally includes an engine brake running means 52, a free-run inertia running means 54, a neutral inertia running means 56, a running mode switching control means 58 and a negative pressure necessity determination means 59. The engine brake running means 52, the free-run inertia running means 54, and the neutral inertia running means 56 are for the purpose of performing three respective running modes depicted in FIG. 3 and the engine brake running means 52 performs an engine brake running mode (hereinafter also referred as "engine brake running"). The engine brake running mode is performed with a coupling state between the engine 12 and the wheels 20 maintained at the time of accelerator-off, and all the cylinders of the engine 12 are driven to rotate to generate an engine brake force from a pumping loss and a friction torque. Although the engine 12 may be in an idling state in which a minimum amount of fuel is supplied as is the case with the time of the accelerator-off, the engine 12 is controlled in a fuel cut state (F/C) in which fuel supply is stopped, in this example. The automatic transmission 16 has a predetermined gear stage established depending on the vehicle speed V etc., and the clutch C1 is retained in an engaged state. As a result, the engine 12 is driven to rotate at a predetermined rotation speed determined depending on the vehicle speed V and the gear ratio e and the engine brake force having a magnitude corresponding to the rotation speed is generated. Since the engine 12 is driven to rotate at a predetermined rotation speed, the amplification effect on the brake operation force Brk is appropriately acquired from the brake booster 42 using the negative pressure generated from the engine rotation, and the vehicle braking force from the brake operation is sufficiently acquired. "Negative pressure supply" of FIG. 3 indicates the presence/absence of supply (charge) of a negative pressure to a negative pressure tank 46 of the brake booster 42 and, if the negative pressure supply is absent, the negative pressure in the negative pressure tank 46 is reduced (comes closer to an atmospheric pressure) due to repeated operations of the brake pedal 40, resulting in a reduction in the amplification effect on the brake operation force Brk.

The free-run inertia running means 54 performs a free-run inertia running mode (hereinafter also referred as "free-run inertia running") at the time of accelerator-off. The free-run inertia running mode is performed by releasing the clutch C1 to separate the engine 12 from the wheels 20 while a fuel cut F/C is performed to stop the fuel supply to the engine 12 so that the rotation of the engine 12 is stopped. In this case, since the engine brake force becomes smaller than that of the engine brake running mode and the release of the clutch C1 results in the engine brake force of substantially zero, a reduction in running resistance extends the running distance of the inertia running mode, and fuel consumption can be improved. On the other hand, the stop of the rotation of the engine 12 results in a reduction in the amplification effect on the brake operation force Brk by the brake booster 42 using the negative pressure generated from the engine rotation. In this example, the free-run inertia running mode is performed as a first inertia running mode.

The neutral inertia running means 56 performs a neutral inertia running mode (hereinafter also referred as "neutral inertia running") at the time of accelerator-off. The neutral inertia running mode is performed by releasing the clutch C1 to separate the engine 12 from the wheels 20 while fuel is supplied to allow the engine 12 to rotate in the idling state (perform self-sustaining rotation). Also in this case, since the engine brake force becomes smaller than that of the engine brake running mode and the release of the clutch C1 results in the engine brake force of substantially zero, a reduction in running resistance extends the running distance of the inertia running mode, and fuel consumption can be improved. On the other hand, since the engine 12 is rotated in the idling state, the amplification effect on the brake operation force Brk can be properly acquired from the brake booster 42 using the negative pressure generated from the engine rotation and the vehicle braking force from the brake operation is ensured. Although fuel is consumed by operating the engine 12 in the idling state, since the distance of the inertia running mode becomes longer as compared to the engine brake running mode, a frequency of reacceleration is reduced and overall fuel consumption is improved. In this example, the neutral inertia running mode is performed as a second inertia running mode.

Figures 2, 3:
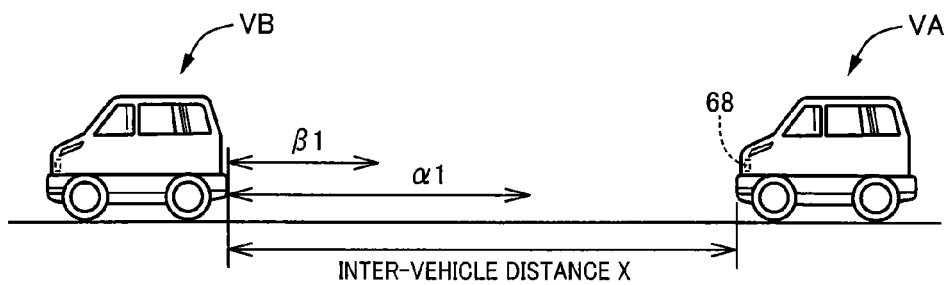
FIG. 2 is a diagram for explaining a relationship between an inter-vehicle distance X measured by an inter-vehicle distance sensor of FIG. 1 and a first determination value $\alpha 1$, a second determination value $\beta 1$.
FIG. 3 is a diagram for explaining three kinds of running modes performed by the vehicle drive device of FIG. 1.
Figure 4:
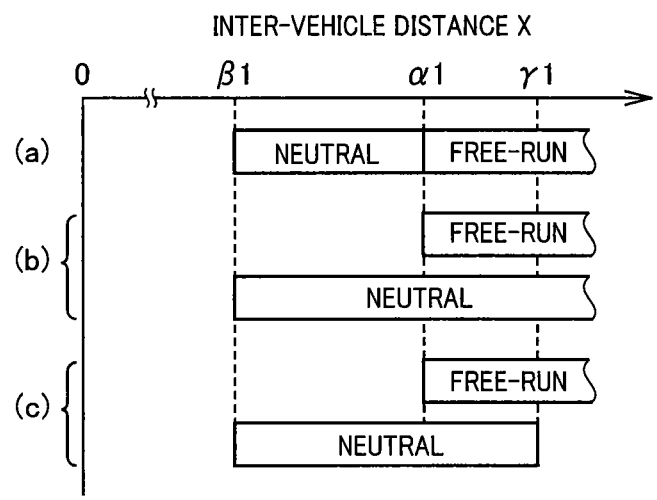
FIG. 4 is a diagram for explaining a difference between execution start ranges in terms of the inter-vehicle distance X of free-run inertia running mode and neutral inertia running mode performed by the vehicle drive device of FIG. 1.

The running mode switching control means 58 switches three running modes of the engine brake running mode, the free-run inertia running mode, and the neutral inertia running mode and performs the inertia running mode based on the inter-vehicle distance X to the preceding vehicle in accordance with an individual case (an execution condition) indicated by any one of (a) to (c) of FIG. 4, for example. The inter-vehicle distance X is a separation distance from a vehicle VA to a preceding vehicle VB as depicted in FIG. 2 and is sequentially measured by the inter-vehicle distance sensor 68, and when the inter-vehicle distance X is shorter, the brake operation is more frequently performed and the necessity of the brake negative pressure PB becomes higher for ensuring a vehicle braking force in the case of a depressing operation of the brake pedal 40. In other words, the necessity of the negative pressure becomes higher as the inter-vehicle distance X becomes shorter and, although a first determination value $\alpha 1$ and a second determination value $\beta 1$ satisfy $\beta 1 < \alpha 1$ in terms of the inter-vehicle distance X, the values are in an inverse relationship in terms of the necessity of the negative pressure. The negative pressure necessity determination means 59 determines the necessity of the negative pressure based on whether the inter-vehicle distance X is equal to or less than the first determination value $\alpha 1$ and whether the inter-vehicle distance X is equal to or less than the second determination value $\beta 1$, and determines that the necessity of the negative pressure is low if the inter-vehicle distance X is larger than the first determination value $\alpha 1$ and that the necessity of the negative pressure is high if the inter-vehicle distance X is equal to or less than the first determination value $\alpha 1$. The negative pressure necessity determination means 59 determines that the necessity of the negative pressure is higher if the inter-vehicle distance X is equal to or less than the second determination value $\beta 1$. FIG. 4 depicts execution start conditions of the free-run inertia running mode and the neutral inertia running mode related to the inter-vehicle distance X and the running mode is switched in accordance with the execution start conditions in this example.

In the case of (a) of FIG. 4, when the inter-vehicle distance X is larger than the first determination value $\alpha 1$, the necessity of the negative pressure is low and, therefore, the free-run inertia running mode is performed and, when the inter-vehicle distance X is equal to or less than the first determination value $\alpha 1$ and larger than the second determination value $\beta 1$, the necessity of the negative pressure is high and, therefore, the neutral inertia running mode is performed that supplies a negative pressure to the negative pressure tank 46 for properly acquiring the amplification effect on the brake operation force Brk by the brake booster 42. When the inter-vehicle distance X is equal to or less than the second determination value $\beta 1$, the necessity of the negative pressure becomes higher and, since it is difficult to sufficiently ensure the vehicle braking force only from the amplification effect on the brake operation force Brk by the brake booster 42, the engine brake running mode is performed so as to acquire a large engine brake force. The first determination value $\alpha 1$ is a lower limit value (smallest value) of the inter-vehicle distance X when the execution of the free-run inertia running mode is started, and corresponds to an upper limit value of the necessity of the negative pressure. The first determination value $\alpha 1$ is also an upper limit value (largest value) of the inter-vehicle distance X when the execution of the neutral inertia running mode is started, and corresponds to a lower limit value of the necessity of the negative pressure. The second determination value $\beta 1$ is a lower limit value (smallest value) of the inter-vehicle distance X when the execution of the neutral inertia running mode is started, and corresponds to an upper limit value of the necessity of the negative pressure.

In the case of (b), when the inter-vehicle distance X is larger than the first determination value $\alpha 1$, the necessity of the negative pressure is low and, therefore, the free-run inertia running mode is performed as is the case with (a); however, a difference is that the neutral inertia running mode is performed when the inter-vehicle distance X is larger than the second determination value $\beta 1$ as well as when the inter-vehicle distance X is larger than the first determination value $\alpha 1$. In this case, in the region larger than the first determination value $\alpha 1$, the free-run inertia running mode and the neutral inertia running mode are performed in accordance with predefined individual cases. For example, since electricity can be generated by an alternator etc. from the rotation of the engine 12 in the neutral inertia running mode, the free-run inertia running mode may be limited depending on a necessity of electric energy when a battery remaining amount is equal to or less than a predetermined amount, so that the neutral inertia running mode is performed even when the inter-vehicle distance X is larger than the first determination value $\alpha 1$, and various other execution conditions can be set. In this case, if the inter-vehicle distance X becomes equal to or less than the first determination value $\alpha 1$ while the free-run inertia running mode is being performed at the inter-vehicle distance X larger than the first determination value $\alpha 1$, a switchover to the neutral inertia running mode is desirably performed, or alternatively, a return to the engine brake running mode may directly be made.

Although (c) is substantially the same as (b) described above, a third determination value $\gamma 1$ is separately set as an execution upper limit value for the neutral inertia running mode in this case and is set to a value larger than the first determination value $\alpha 1$. In this case, when the inter-vehicle distance X is larger than the third determination value $\gamma 1$, the free-run inertia running mode is performed and, if the inter-vehicle distance X becomes equal to or less than the third determination value γ1, a switchover to the neutral inertia running mode may be performed as needed, or alternatively, if the inter-vehicle distance X becomes equal to or less than the third determination value γ1, the neutral inertia running mode may be performed without performing the free-run inertia running mode.

Figure 5:
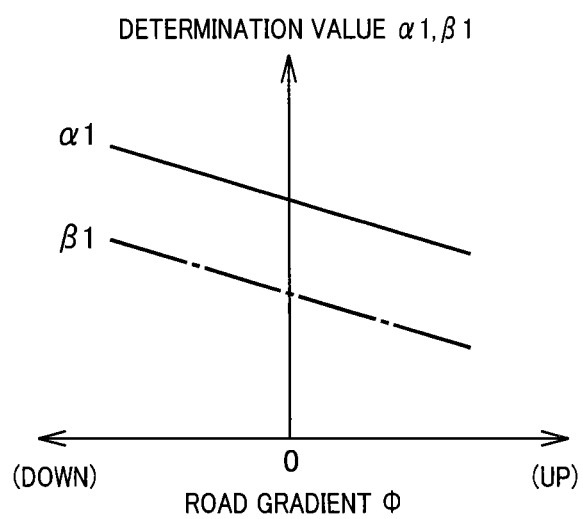
FIG. 5 is a diagram for indicating an example of a data map when the determination values $\alpha 1$, $\beta 1$ of FIG. 3 are set depending on a road gradient $\Phi$.

The determination values α1 and β1 may be defined as constant values in advance or may be set by using the road gradient Φ as a parameter as depicted in FIG. 5, for example. In particular, since a larger vehicle braking force is generally required on a down-slope when a road gradient is negative as compared to a substantially horizontal flat road, the determination values α1 and β1 are made larger to make a shift from the free-run inertia running mode to the neutral inertia running mode at a larger inter-vehicle distance X so that the amplification effect on the brake operation force Brk by the brake booster 42 can properly be acquired, or a return to the engine brake running mode is made so that a larger engine brake force is acquired. In contrast, a request for a vehicle braking force is low on an up-slope when a road gradient is positive as compared to a substantially horizontal flat road, the determination values α1 and β1 are made smaller to expand execution ranges of the free-run inertia running mode and the neutral inertia running mode so that the fuel consumption can further be improved. The determination values α1 and β1 as described above are defined in advance from a data map, a computing equation, etc. The third determination value γ1 may also be set by using the road gradient D as a parameter as is the case with the determination values α1 and β1. With regard to the necessity of the negative pressure, the determination value of the necessity of the negative pressure is made smaller on a down-slope so that a switchover to the neutral inertia running mode or the engine brake running mode is performed at a lower level of the necessity of the negative pressure, while the determination value of the necessity of the negative pressure is made larger on an up-slope so that the a shift to the neutral inertia running mode or the engine brake running mode is made difficult.

Figure 6:
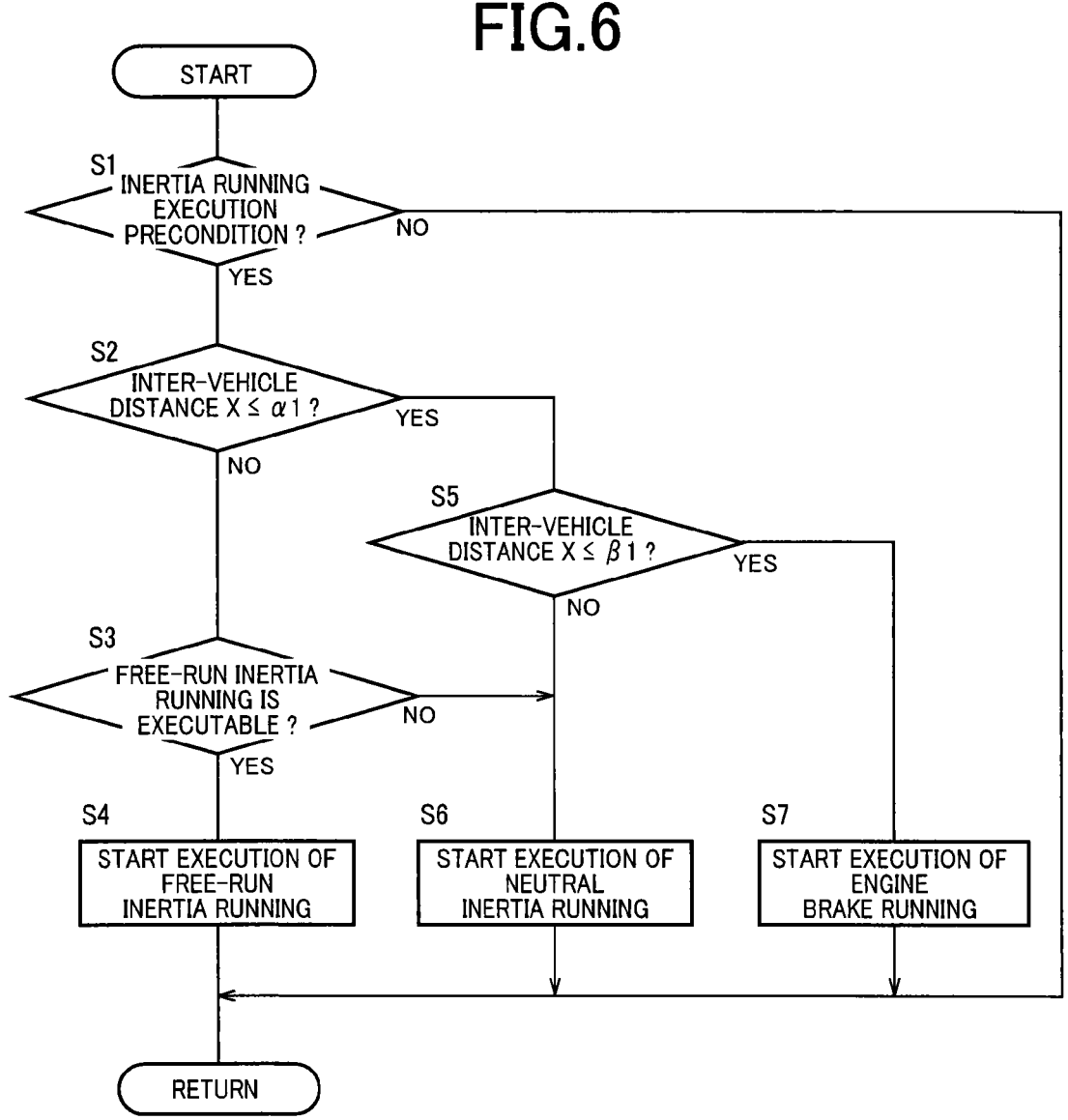
FIG. 6 is a flow chart for explaining an operation of an execution start determination of the inertia running mode performed by the electronic control device of FIG. 1.

FIG. 6 is a flowchart of an operation at the time of making an execution start determination of the free-run inertia running mode and the neutral inertia running mode by the running mode switching control means 58. In the flowchart of FIG. 6, steps S2 and S5 correspond to the negative pressure necessity determination means 59 and act as a prediction means predicting the necessity of the negative pressure based on the inter-vehicle distance X.

At step S1, it is determined whether a precondition is satisfied for starting the execution of any one of the free-run inertia running mode and the neutral inertia running mode. The precondition is, for example, that a state of the accelerator operation amount θacc of substantially zero, i.e., accelerator-off (non-operation), and the brake operation force Brk of substantially zero, i.e., brake-off (non-operation), continues for a certain time period or longer, and if the precondition is satisfied, step S2 is executed. At step S2, it is determined whether the inter-vehicle distance X is equal to or less than the first determination value α1, and the process from step S5 is executed in the case of X≤α1, or step S3 is executed in the case of X>α1, i.e., if the necessity of the negative pressure is low. At step S3, it is determined whether the free-run inertia running mode is executable (suitable) and, if executable or suitable, the execution of the free-run inertia running mode is started at step S4. If the free-run inertia running mode is not executable or suitable, the execution of the neutral inertia running mode is started at step S6. If the free-run inertia running mode is not executable (not suitable), this is the case that a necessity of electric energy is high such as when a battery remaining amount is equal to or less than a predetermined amount, for example, and the free-run inertia running mode is prohibited so that the neutral inertia running mode of step S6 is immediately performed. In the case of (a) of FIG. 4, step S3 may be omitted so that the free-run inertia running mode is always performed at the time of x>α1.

At step S5 executed if the determination of step S2 is YES (affirmative), i.e., in the case of X≤α1, it is determined whether the inter-vehicle distance X is equal to or less than the second determination value β1 and, in the case of X>β1, the execution of the neutral inertia running mode is started at step S6. In the case of X≤β1, i.e., if the inter-vehicle distance X is shorter than the second determination value β1, a large vehicle braking force may immediately be required in association with a brake operation and, therefore, the execution of the inertia running mode is prohibited so that the execution of the engine brake running mode is started or continued at step S7. Although FIG. 6 is the flowchart for explaining the operation at the time of starting the execution of the free-run inertia running mode and the neutral inertia running mode, signal processes are executed in terms of the inter-vehicle distance X in accordance with the flowchart same as the process from step S2 even in execution of the inertia running mode, and the free-run inertia running mode and the neutral inertia running mode are switched during running based on the inter-vehicle distance X and whether the free-run inertia running mode is executable. If the determination of step S3 is NO or if the determination of step S5 is NO, step S6 is always executed to start the neutral inertia running mode, or alternatively, it can be arranged that whether the neutral inertia running mode is possible (suitable) is determined so as to start the engine brake running mode at step S7 if not possible (not suitable).

Figure 7:
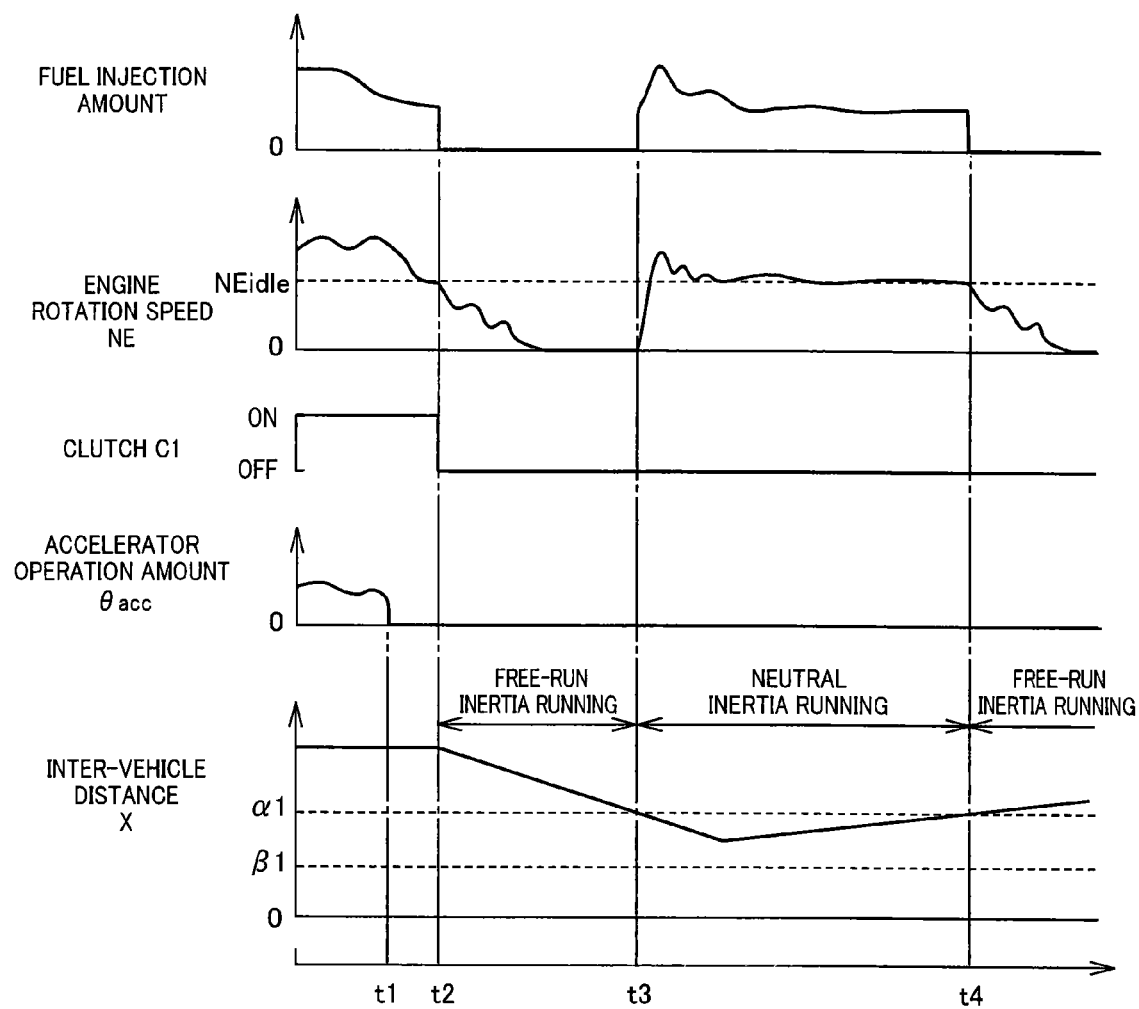
FIG. 7 is an example of a time chart indicative of changes in an operation state of portions when the inertia running mode is performed in accordance with the flow chart of FIG. 6.

FIG. 7 is an example of a time chart of changes in operation states of the portions when the inertia running mode is performed in accordance with the flowchart of FIG. 6 and, although FIG. 7 depicts the case of (a) or (b) of FIG. 4, the control is provided also in the case of (c) as depicted in FIG. 7 under a certain condition. Time t1 of FIG. 7 is the time of accelerator-off and, after a certain time has elapsed (at time t2), the clutch C1 is released (OFF) and a fuel cut is performed to start the execution of the free-run inertia running mode. Time t3 is the time when the inter-vehicle distance X becomes equal to or less than the first determination value α1 and the determination of step S2 becomes YES (affirmative) to start the execution of the neutral inertia running mode at step S6, and the engine 12 is restarted by fuel supply and is put into an idling state in which the engine rotation speed NE is at around an idle rotation speed NEidle. Subsequently, when the inter-vehicle distance X to the preceding vehicle becomes larger and X>α1 is satisfied at time t4, a fuel cut is performed again to stop the rotation of the engine 12 and the free-run inertia running mode is resumed.

Figure 8:
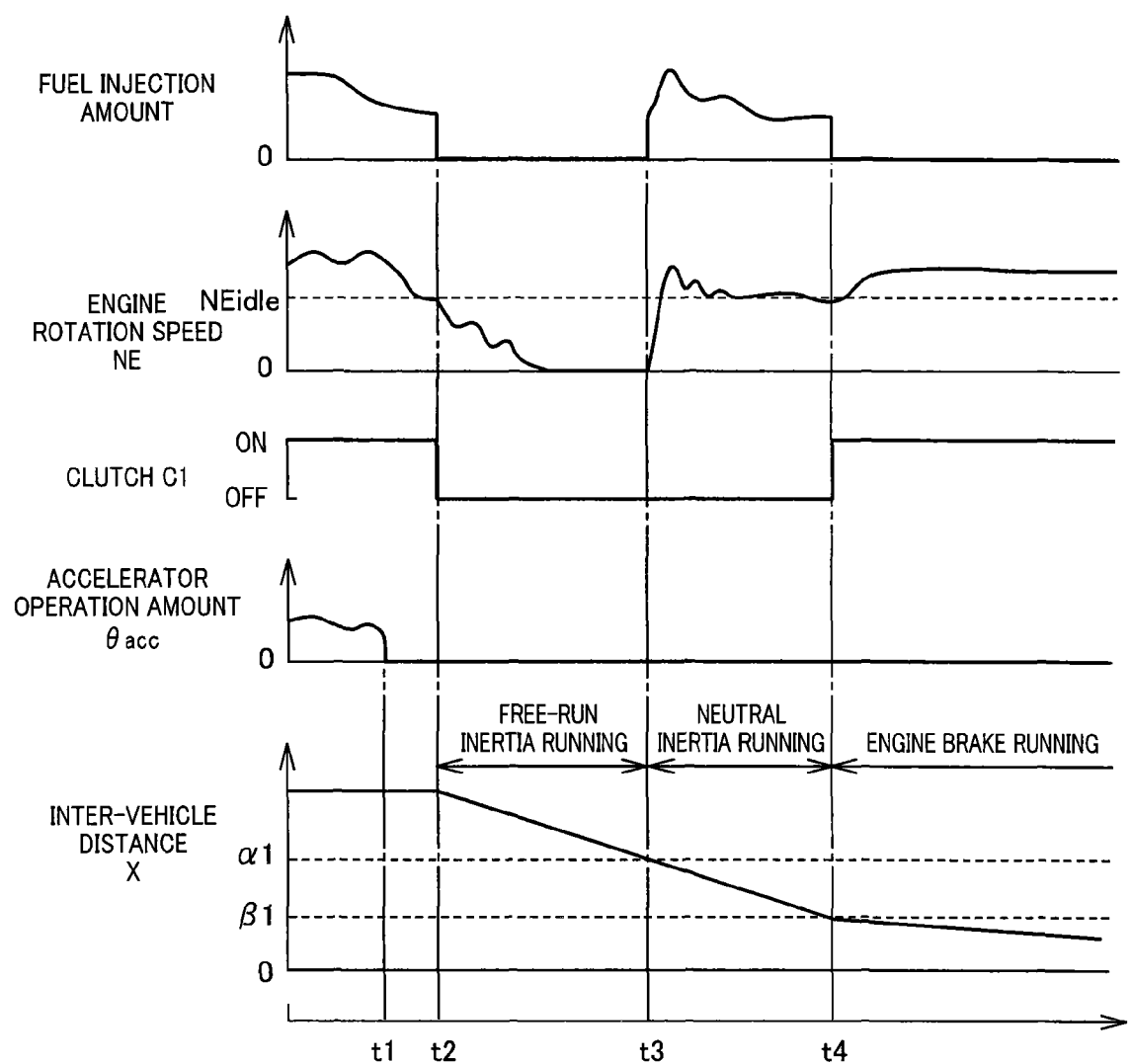
FIG. 8 is an example of a time chart indicative of changes in an operation state of portions when the inertia running mode is performed in accordance with the flow chart of FIG. 6 in a different manner from FIG. 7.

Although FIG. 8 is the same as FIG. 7 until the execution of the neutral inertial running is started at time t3, the inter-vehicle distance X is gradually made shorter even after the shift to the neutral inertial running in this case and, when the inter-vehicle distance X becomes equal to or less than the second determination value β1 at time t4, the determination of step S5 becomes YES and step S7 is executed to cancel the inertia running mode for returning to the engine brake running mode. In particular, since a fuel cut is performed while the clutch C1 is engaged (i.e., the clutch C1 is "ON") and the engine 12 is driven to rotate depending on the vehicle speed V and the gear ratio e of the gear stage, the negative pressure tank 46 is charged with the negative pressure by the pumping action while a large engine brake force is generated. Since the engine 12 is operated at around the idle rotation speed NEidle during the neutral inertia running mode, the clutch C1 can be relatively smoothly engaged when the shift to the engine brake running mode is made.

As described above, the vehicle drive device 10 of this example performs both the free-run inertia running mode and the neutral inertia running mode as the inertia running mode and the execution of the free-run inertia running mode performed with the rotation of the engine 12 stopped is started on the condition that the inter-vehicle distance X is larger than the first determination value α1, i.e., the necessity of the negative pressure is relatively low. In particular, in a running state associated with a low necessity of the amplification effect on the brake operation force Brk by the brake booster 42, the free-run inertia running mode is performed with the rotation of the engine 12 stopped without generating the negative pressure and, therefore, the engine brake force is significantly reduced so that the running distance of the inertia running mode is significantly extended, leading to acquisition of an excellent fuel consumption improvement effect.

On the other hand, since the neutral inertia running mode performed with the engine 12 kept rotating is performed even when the inter-vehicle distance X is equal to or less than the first determination value α1, i.e., the necessity of the negative pressure is relatively high, the amplification effect on the brake operation force Brk by the brake booster 42 is properly acquired from the engine rotation although the fuel consumption efficiency is lower as compared to the free-run inertia running mode, and the fuel consumption more excellent than that of the engine brake running mode can be acquired while ensuring the vehicle braking force from the brake operation. In particular, as compared to the case of uniformly prohibiting the inertia running mode at the first determination value α1 or less, the fuel consumption can be improved while ensuring the amplification effect on the brake operation force Brk since the neutral inertia running mode is performed even at the first determination value α1 or less.

As described above, the execution of the free-run inertia running mode performed with the rotation of the engine 12 stopped to acquire the excellent fuel consumption efficiency is started when the inter-vehicle distance X is larger than the first determination value α1 and the necessity of the negative pressure is low, while the execution of the neutral inertia running mode performed with the engine 12 kept rotating to properly acquire the amplification effect on the brake operation force Brk by the brake booster 42 is started when the inter-vehicle distance X is equal to or less than the first determination value α1 and the necessity of the negative pressure is relatively high, and therefore, as compared to the case of performing only any one of the free-run inertia running mode and the neutral inertia running mode, the overall fuel consumption can further be improved while properly ensuring the vehicle braking force including the amplification effect on the brake operation force Brk.

If a shift to the neutral inertia running mode is made when the inter-vehicle distance X becomes equal to or less than the first determination value α1 during the execution of the free-run inertia running mode and a return to the engine brake running mode is made when the inter-vehicle distance X becomes equal to or less than the second determination value β1 during the execution of the neutral inertia running mode as depicted in the time chart of FIG. 8, the amplification effect on the brake operation force Brk by the brake booster 42 is acquired depending on the inter-vehicle distance X, leading to the acquisition of the large engine brake force from the engine brake running mode, and therefore, the fuel consumption can further be improved while properly ensuring the large vehicle braking force including the amplification effect on the brake operation force Brk depending on the necessity of the negative pressure.

If a shift to the neutral inertia running mode is made when the inter-vehicle distance X becomes equal to or less than the first determination value α1 during the execution of the free-run inertia running mode and the free-run inertia running mode is performed again when the inter-vehicle distance X exceeds the first determination value α1 during the execution of the neutral inertia running mode as depicted in FIG. 7, the fuel consumption can further be improved while properly ensuring the amplification effect on the brake operation force Brk.

In both the free-nm inertia running mode performed as the first inertia running mode and the neutral inertia running mode performed as the second inertia running mode, the clutch C1 is released to make the engine brake force substantially zero and the engine brake force is considerably reduced as compared to the engine brake running mode, resulting in a longer running distance of the inertia running mode and an improvement in fuel consumption.

Since the first determination value α1 and the second determination value β1 are variably set depending on the road gradient Φ as depicted in FIG. 5 and are set to larger values on a down-slope as compared to a flat road, the neutral inertia running mode and the engine brake running mode are performed at a larger inter-vehicle distance X, and the amplification effect of the brake booster 42 is promptly acquired, while a large engine brake force from the engine brake running mode is promptly acquired, so that a large vehicle braking force can be ensured on a down-slope. Although smaller values are used on an up-slope as compared to a flat road, since a request for a vehicle braking force is relatively small on an up-slope, the execution ranges of the free-run inertia running mode and the neutral inertia running mode are expanded without deteriorating the vehicle braking force from the brake operation, resulting in a longer running distance of the inertia running mode and a further improvement in fuel consumption.

Although the execution start control of the inertia running mode of FIG. 6 is provided by using the actual inter-vehicle distance X measured by the inter-vehicle distance sensor 68 such as a radar in the example, the respective accelerations of the vehicle VA and the preceding vehicle VB may be obtained to estimate a future inter-vehicle distance X and determine the presence/absence of the necessity of the negative pressure from an acceleration difference therebetween for providing the execution start control of the inertia running mode.

Another example of the present invention will be described.

Figure 9:
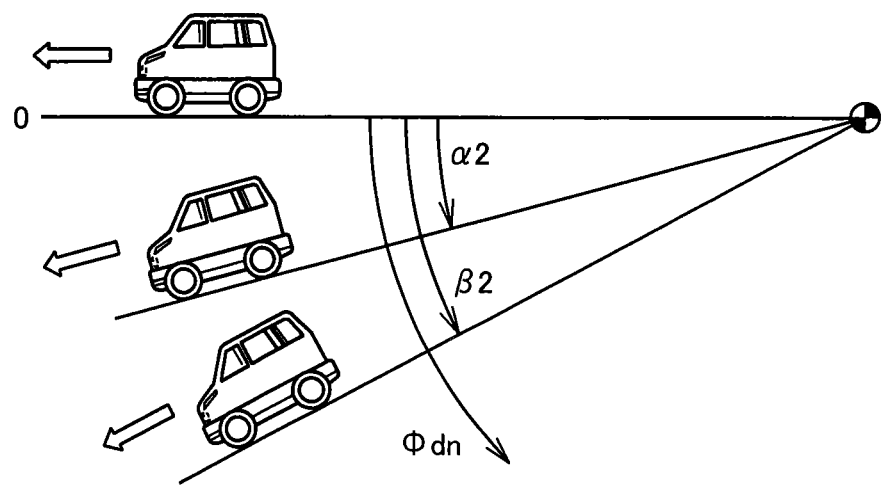
FIG. 9 is a diagram for explaining another example of the present invention and a diagram for explaining a first determination value $\alpha 2$ and a second determination value $\beta 2$ when the executions of the free-run inertia running mode, the neutral inertia running mode and the engine brake running mode are started depending on a down-gradient Ddn of a road surface instead of the inter-vehicle distance X.
Figure 10:
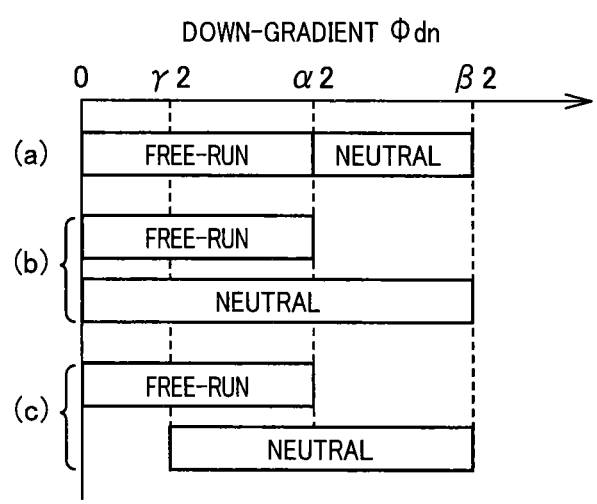
FIG. 10 is a diagram for explaining a difference between execution start ranges of the free-run inertia running mode and the neutral inertia running mode in terms of the down-gradient $\Phi$dn.

FIGS. 9 and 10 depict the case of determining the necessity of the negative pressure based on a down-gradient Φdn of a road surface and, when the down-gradient Φdn becomes larger, a driver more frequently performs the brake operation so as to suppress an increase in the vehicle speed V, and the necessity of the brake negative pressure PB becomes higher for ensuring a vehicle braking force in the case of a depressing operation of the brake pedal 40. The down-gradient Φdn is obtained on the assumption that a downward gradient from a horizontal state (Φdn=0) is positive (+) as depicted in FIG. 9, and is sequentially calculated from the gradient Φ measured by the road gradient sensor 70. FIG. 10 depicts execution start conditions of the three running modes of the engine brake running mode, the free-run inertia running mode, and the neutral inertia running mode, and the execution thereof is started in accordance with an individual case (an execution condition) indicated by any one of (a) to (c) based on the down-gradient Φdn. A first determination value α2 and a second determination value β2 have the relationship of α2<β2 and the same relationship is established in terms of the necessity of the negative pressure. The negative pressure necessity determination means 59 determines the necessity of the negative pressure based on whether the down-gradient Φdn is larger than the first determination value α2 and whether the down-gradient Φdn is larger than the second determination value β2, and determines that the necessity of the negative pressure is low if the down-gradient Φdn is equal to or less than the first determination value α2 and that the necessity of the negative pressure is high if the down-gradient Φdn is larger than the first determination value α2. The negative pressure necessity determination means 59 determines that the necessity of the negative pressure is higher if the down-gradient Φdn is larger than the second determination value β2. FIG. 10 depicts the execution start conditions of the free-run inertia running mode and the neutral inertia running mode related to the down-gradient Φdn and the running mode is switched in accordance with the execution start conditions in this example.

In FIG. 10, (a) indicates that the free-run inertia running mode is performed when the down-gradient Φdn is equal to or less than the first determination value α2, including the case of the down-gradient Φdn=0 (a flat road), that the neutral inertia running mode is performed when the down-gradient Φdn is larger than the first determination value α2 and equal to or less than the second determination value β2, and that the engine brake running mode is performed when the down-gradient Φdn is larger than the second determination value β2. If the down-gradient Φdn is negative (−), i.e., in the case of an up-slope, for example, the same running mode as that of the down-gradient Φdn=0 may be performed.

In the case of (b), the free-run inertia running mode is performed when the down-gradient Φdn is equal to or less than the first determination value α2, including the case of the down-gradient Φdn=0, as is the case with (a); however, a difference is that the neutral inertia running mode is performed when the down-gradient Φdn is equal to or less than the second determination value β2, including the case of the down-gradient Φdn=0. In this case, when the down-gradient Φdn is equal to or less than the first determination value α2, the free-run inertia running mode and the neutral inertia running mode are performed in accordance with predefined individual cases. In this case, if the down-gradient Φdn exceeds the first determination value α2 while the free-run inertia running mode is being performed at the first determination value α2 or less, a switchover to the neutral inertia running mode is desirably performed, or alternatively, a return to the engine brake running mode may directly be made. If the down-gradient Ddn is negative (−), i.e., in the case of an up-slope, the same running mode as that of the down-gradient Φdn=0 may be performed as is the case with (a).

Although (c) is substantially the same as (b) described above, a third determination value γ2 is set as an execution lower limit value for the neutral inertia running mode separately from the down-gradient Φdn=0 in this case and is set to a value larger than zero and smaller than the first determination value α2. In this case, the free-run inertia running mode is performed at the third determination value γ2 or less, and, if the third determination value γ2 is exceeded, a switchover to the neutral inertia running mode may be performed as needed, or alternatively, if the third determination value γ2 is exceeded, the neutral inertia running mode may be performed without performing the free-run inertia running mode. If the down-gradient Φdn is negative (−), i.e., in the case of an up-slope, the same running mode as that of the down-gradient Φdn=0 may be performed as is the case with (a).

The determination values α2, β2, and γ2 may be defined as constant values in advance or may variably be set by using a vehicle state or a running state as a parameter from a predefined data map, etc.

Figure 11:
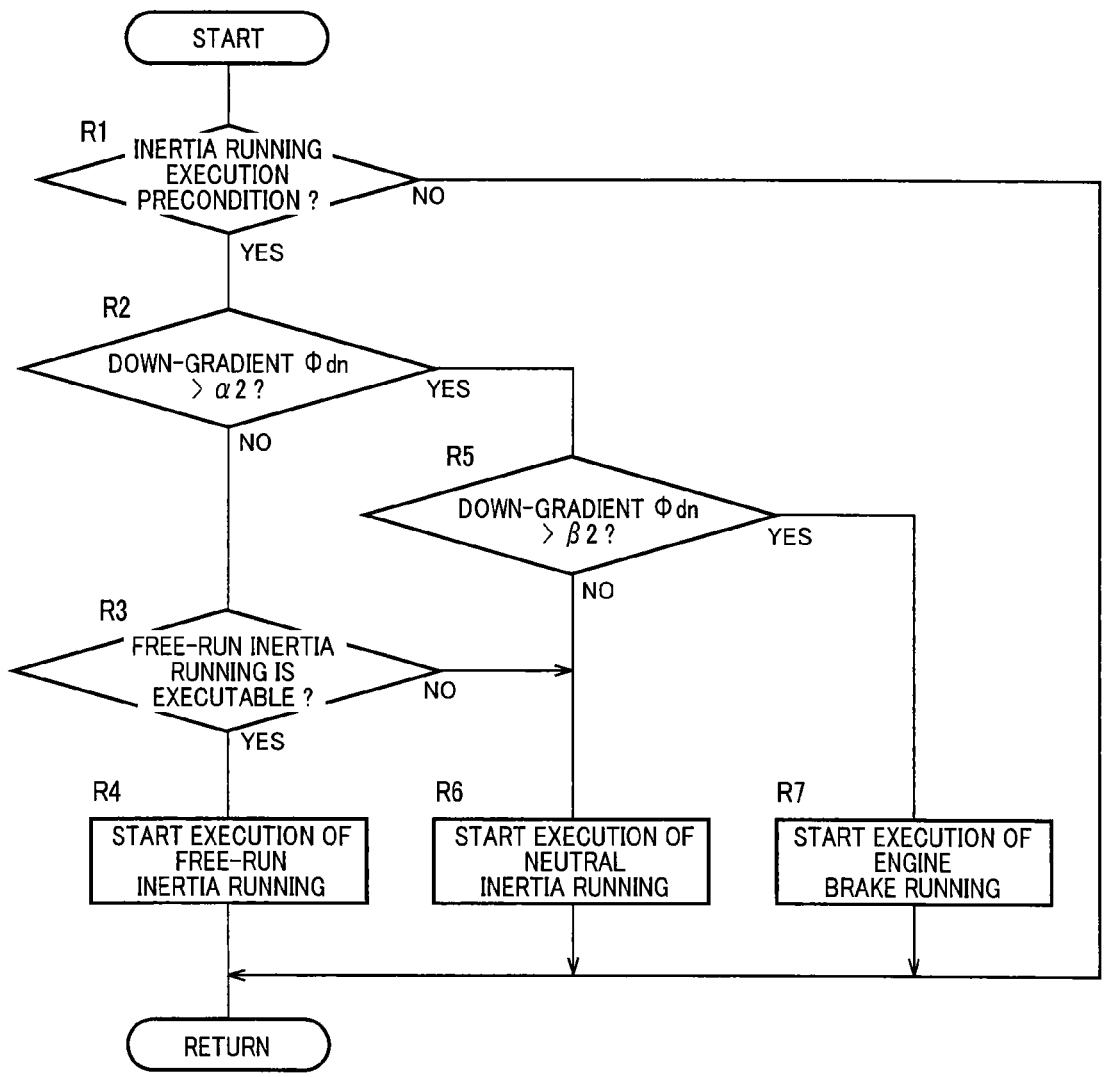
FIG. 11 is a flow chart for explaining an operation when the executions of the free-run inertia running mode, the neutral inertia running mode and the engine brake running mode are started depending on a down-gradient $\Phi$dn.

FIG. 11 is a flowchart of an operation at the time of making an execution start determination of the free-run inertia running mode and the neutral inertia running mode by the running mode switching control means 58 and is a flowchart executed instead of that of FIG. 6 described above. Steps R1, R3, R4, R6, and R7 of FIG. 11 are the same as steps S1, S3, S4, S6, and S7, respectively, of FIG. 6 and only steps R2 and R5 are different. Steps R2 and R5 correspond to the negative pressure necessity determination means 59 and act as a prediction means predicting the necessity of the negative pressure based on the down-gradient Φdn.

At step R2 of FIG. 11, it is determined whether the down-gradient Φdn exceeds the first determination value α2 and the process from step R5 is executed in the case of Φdn>α2, or the process from step R3 is executed in the case of Φdn≤α2, i.e., if the necessity of the negative pressure is low. From step R3, the execution of the free-run inertia running mode or the neutral inertia running mode is started as is the case with the example. At step R5, it is determined whether the down-gradient Φdn exceeds the second determination value β2, and the execution of the neutral inertia running mode is started at step R6 in the case of Φdn≤β2 or the execution of the engine brake running mode is started or continued in the case of Φdn>β2. Although FIG. 11 is the flowchart for explaining the operation at the time of starting the execution of the free-run inertia running mode and the neutral inertia running mode, signal processes are executed in terms of the down-gradient Φdn in accordance with the flowchart same as the process from step R2 even in execution of the inertia running mode, and the free-run inertia running mode and the neutral inertia running mode are switched during running based on the down-gradient Φdn and whether the free-run inertia running mode is executable. If the determination of step R3 is NO or if the determination of step R5 is NO, step R6 is always executed to start the neutral inertia running mode, or alternatively, it can be arranged that whether the neutral inertia running mode is possible (suitable) is determined so as to start the engine brake running mode at step R7 if not possible (not suitable).

Figure 12:
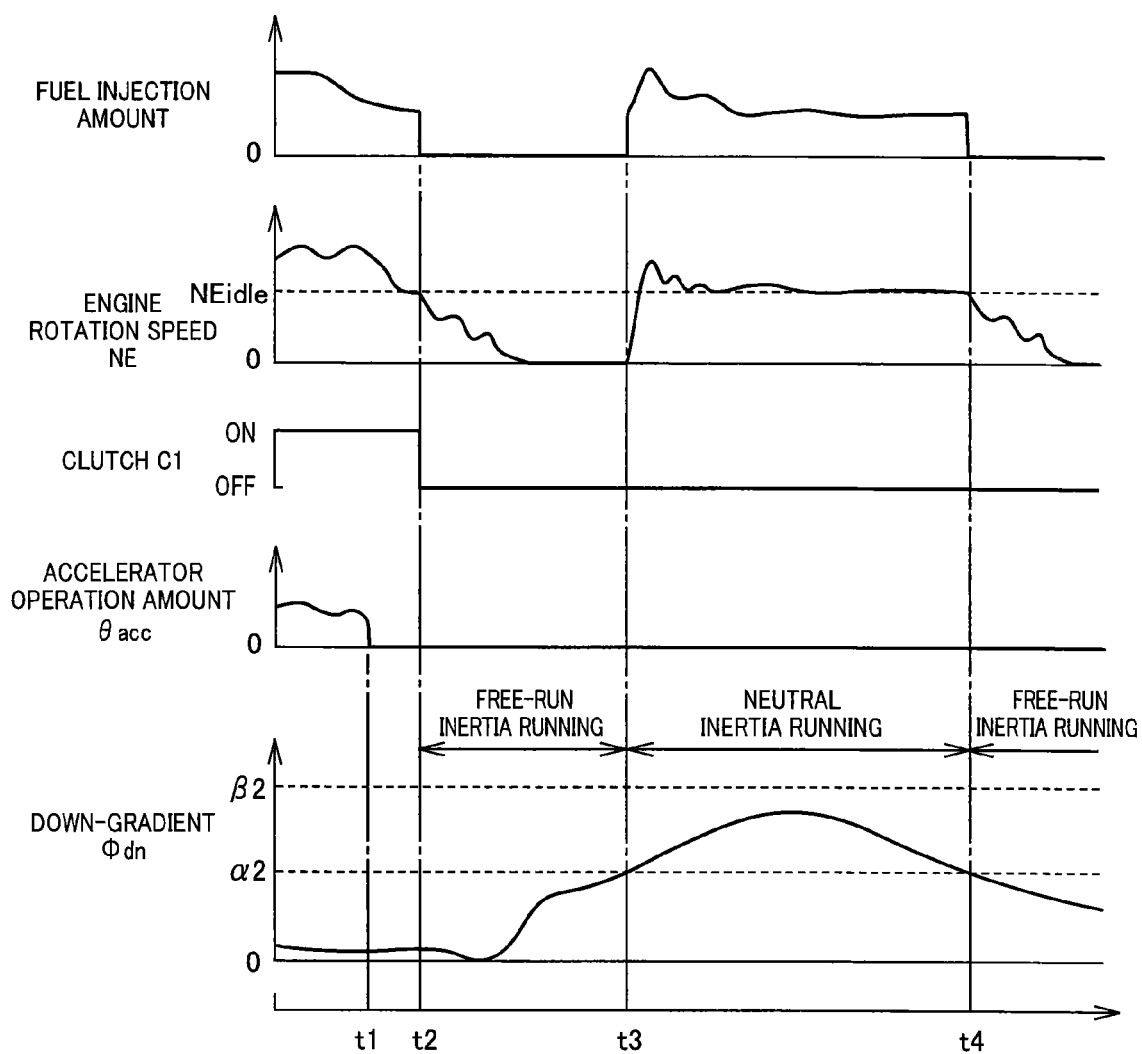
FIG. 12 is an example of a time chart indicative of changes in an operation state of portions when the inertia running mode is performed in accordance with the flow chart of FIG. 11.

FIG. 12 is an example of a time chart indicative of changes in an operation state of portions when the inertia running mode is performed in accordance with the flow chart of FIG. 11 and, although FIG. 12 depicts the case of (a) or (b) of FIG. 10, the control is provided also in the case of (c) as depicted in FIG. 12 under a certain condition. Time t1 of FIG. 11 is the time of accelerator-off and, after a certain time has elapsed (at time t2), the clutch C1 is released (OFF) and a fuel cut is performed to start the free-run inertia running mode. Time t3 is the time when the down-gradient Φdn exceeds the first determination value α2 and the determination of step R2 becomes YES (affirmative) to start the execution of the neutral inertia running mode at step R6, and the engine 12 is restarted by fuel supply and is put into an idling state in which the engine rotation speed NE is at around the idle rotation speed NEidle. Subsequently, when the down-gradient Φdn becomes smaller and Φdn≤α2 is satisfied at time t4, a fuel cut is performed again to stop the rotation of the engine 12 and the free-run inertia running mode is resumed.

Figure 13:
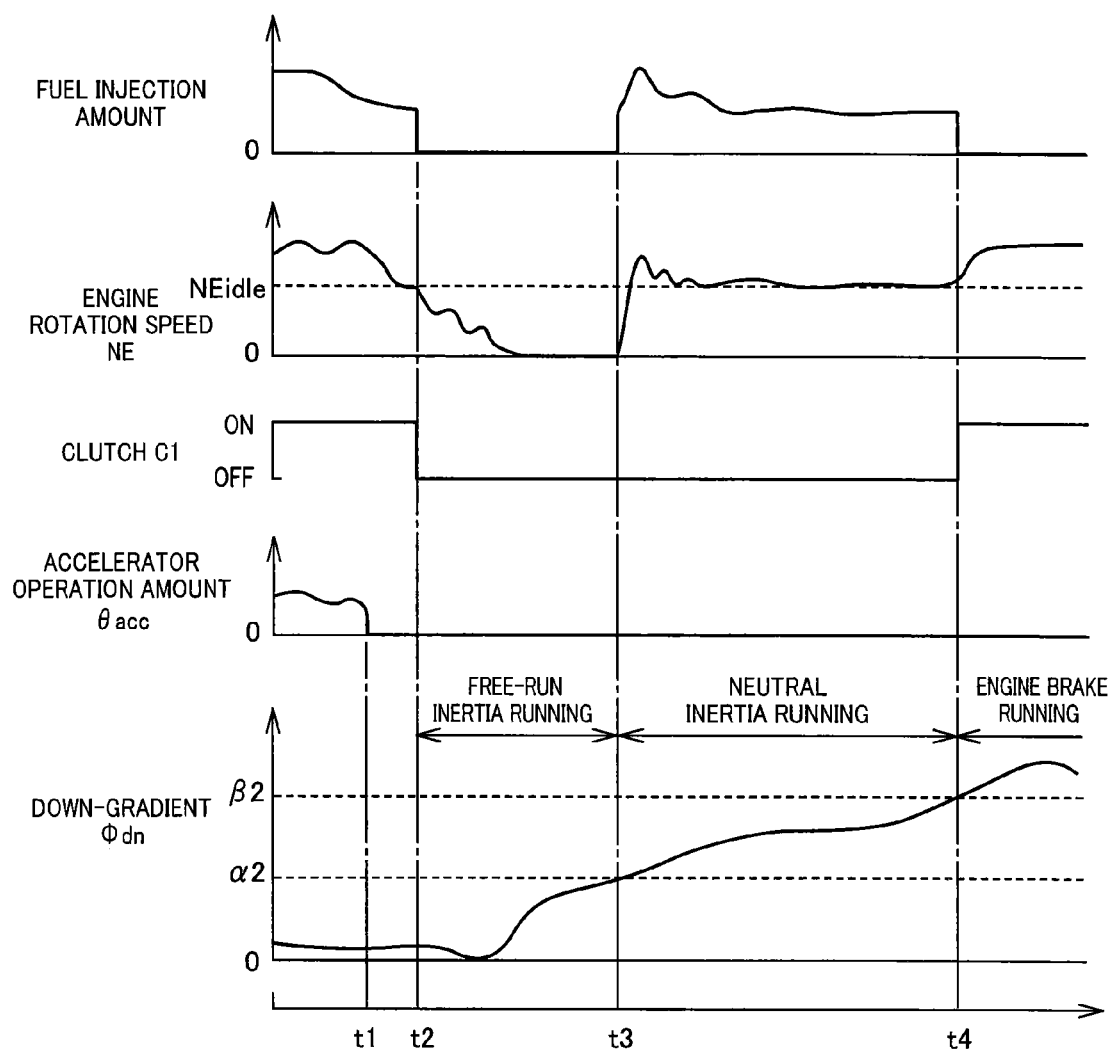
FIG. 13 is an example of a time chart indicative of changes in an operation state of portions when the inertia running mode is performed in accordance with the flow chart of FIG. 11 in a different manner from FIG. 12.

Although FIG. 13 is the same as FIG. 12 until the execution of the neutral inertial running is started at time t3, the down-gradient Φdn further increases even after the shift to the neutral inertial running in this case and, when the down-gradient Φdn exceeds the second determination value β2 at time t4, the determination of step R5 becomes YES and step R7 is executed to cancel the inertia running mode for returning to the engine brake running mode.

As described above, although this example is different from the example in that the necessity of the negative pressure is determined based on the down-gradient Φdn of a road surface, the execution of the free-run inertia running mode performed with the rotation of the engine 12 stopped to acquire the excellent fuel consumption efficiency is started when the down-gradient Φdn is equal to or less than the first determination value α2 and the necessity of the negative pressure is low, while the execution of the neutral inertia running mode performed with the engine 12 kept rotating to properly acquire the amplification effect on the brake operation force Brk by the brake booster 42 is started when the down-gradient Φdn exceeds the first determination value α2 and the necessity of the negative pressure is relatively high, and therefore, as compared to the case of performing only any one of the free-run inertia running mode and the neutral inertia running mode, the overall fuel consumption can further be improved while properly ensuring the amplification effect on the brake operation force Brk, resulting in the acquisition of the same effect as the example.

Figure 14:
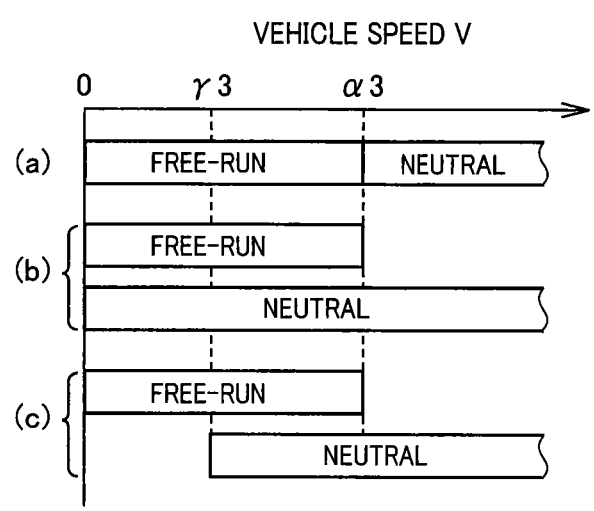
FIG. 14 is a diagram for explaining yet another example of the present invention and a diagram for explaining a difference between execution start ranges when the executions of the free-run inertia running mode and the neutral inertia running mode are started depending on a vehicle speed V.

FIG. 14 depicts the case of determining the necessity of the negative pressure based on the vehicle speed V and, when the vehicle speed V becomes larger, a larger vehicle braking force is required when a driver performs the brake operation, and the necessity of the brake negative pressure PB becomes higher for ensuring a vehicle braking force in the case of a depressing operation of the brake pedal 40. FIG. 14 depicts execution start conditions of the three running modes of the engine brake running mode, the free-run inertia running mode, and the neutral inertia running mode, and the execution thereof is started in accordance with an individual case (an execution condition) indicated by any one of (a) to (c) based on the vehicle speed V. In particular, the necessity of the negative pressure is determined based on whether the vehicle speed V is equal to or less than a first determination value α3, and it is determined that the necessity of the negative pressure is low if the vehicle speed V is equal to or less than the first determination value α3 and that the necessity of the negative pressure is high if the vehicle speed V is larger than the first determination value α3. FIG. 14 depicts the execution start conditions of the free-run inertia running mode and the neutral inertia running mode related to the vehicle speed V and the running mode is switched in accordance with the execution start conditions in this example. A second determination value β3 larger than the first determination value α3 may be set as is the case with the example so as to cancel the inertia running mode and return to the engine brake running mode if the vehicle speed V exceeds the second determination value β3 and such a mode is the example of the present invention.

In the case of (a) of FIG. 14, the free-run inertia running mode is performed when the vehicle speed V is equal to or less than the first determination value α3, and the neutral inertia running mode is performed when the vehicle speed V is larger than the first determination value α3. In the case of (b), when the vehicle speed V is equal to or less than the first determination value α3, the free-run inertia running mode is performed as is the case with (a); however, a difference is that the neutral inertia running mode is performed not only when the vehicle speed V is larger than the first determination value α3 but also when the vehicle speed V is equal to or less than the first determination value α3. In this case, when the vehicle speed V is equal to or less than the first determination value α3, the free-run inertia running mode and the neutral inertia running mode are performed in accordance with predefined individual cases. In this case, if the vehicle speed V exceeds the first determination value α3 while the free-run inertia running mode is being performed at the first determination value α3 or less, a switchover to the neutral inertia running mode is desirably performed, or alternatively, a return to the engine brake running mode may directly be made.

Although (c) is substantially the same as (b) described above, a value larger than the vehicle speed V=0 and smaller than the first determination value α3 is set as a third determination value γ3, which is an execution lower limit value for the neutral inertia running mode. In this case, the free-run inertia running mode is performed at the third determination value γ3 or less and, if the third determination value γ3 is exceeded, a switchover to the neutral inertia running mode may be performed as needed, or alternatively, if the third determination value γ3 is exceeded, the neutral inertia running mode may be performed without performing the free-run inertia running mode.

The determination values α3 and γ3 may be defined as constant values in advance or may variably be set by using a vehicle state or a running state as a parameter from a predefined data map, etc.

Figure 15:
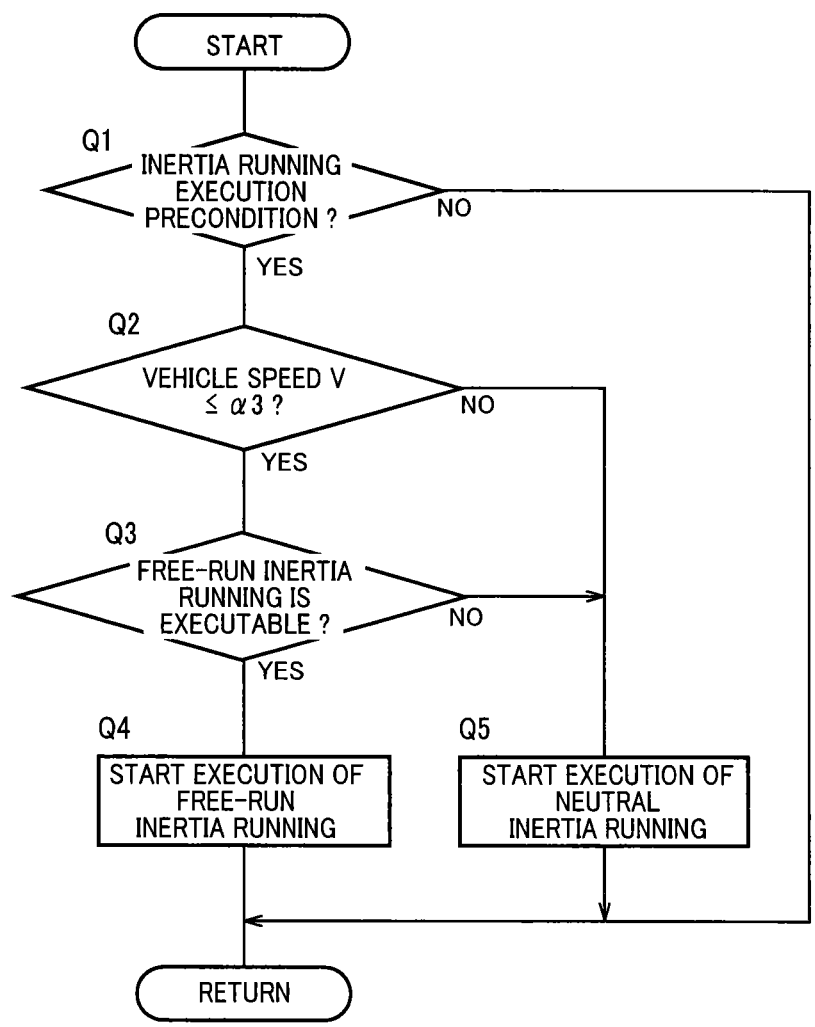
FIG. 15 is a flow chart for explaining an operation when the executions of the free-run inertia running mode and the neutral inertia running mode are started depending on the vehicle speed V.

FIG. 15 is a flowchart of an operation at the time of making an execution start determination of the free-run inertia running mode and the neutral inertia running mode by the running mode switching control means 58 and is a flowchart executed instead of that of FIG. 6 described above. Steps Q1, Q3, Q4, and Q5 of FIG. 15 are the same as steps S1, S3, S4, and S6, respectively, of FIG. 6 and steps Q2 is different. Step Q2 corresponds to the negative pressure necessity determination means 59 and acts as a prediction means predicting the necessity of the negative pressure based on the vehicle speed V.

At step Q2 of FIG. 15, it is determined whether the vehicle speed V is equal to or less than the first determination value α3, and the process from step Q3 is executed in the case of V≤α3, i.e., if the necessity of the negative pressure is low. From step Q3, the execution of the free-run inertia running mode or the neutral inertia running mode is started as is the case with the example. If the determination of step Q2 is NO (negative) because of V>α3, i.e., if the necessity of the negative pressure is high, step Q5 is immediately executed to start the execution of the neutral inertia running mode. Although FIG. 15 is the flowchart for explaining the operation at the time of starting the execution of the free-run inertia running mode and the neutral inertia running mode, signal processes are executed in terms of the vehicle speed V in accordance with the flowchart same as the process from step Q2 even in execution of the inertia running mode, and the free-run inertia running mode and the neutral inertia running mode are switched during running based on the vehicle speed V and whether the free-run inertia running mode is executable.

Figure 16:
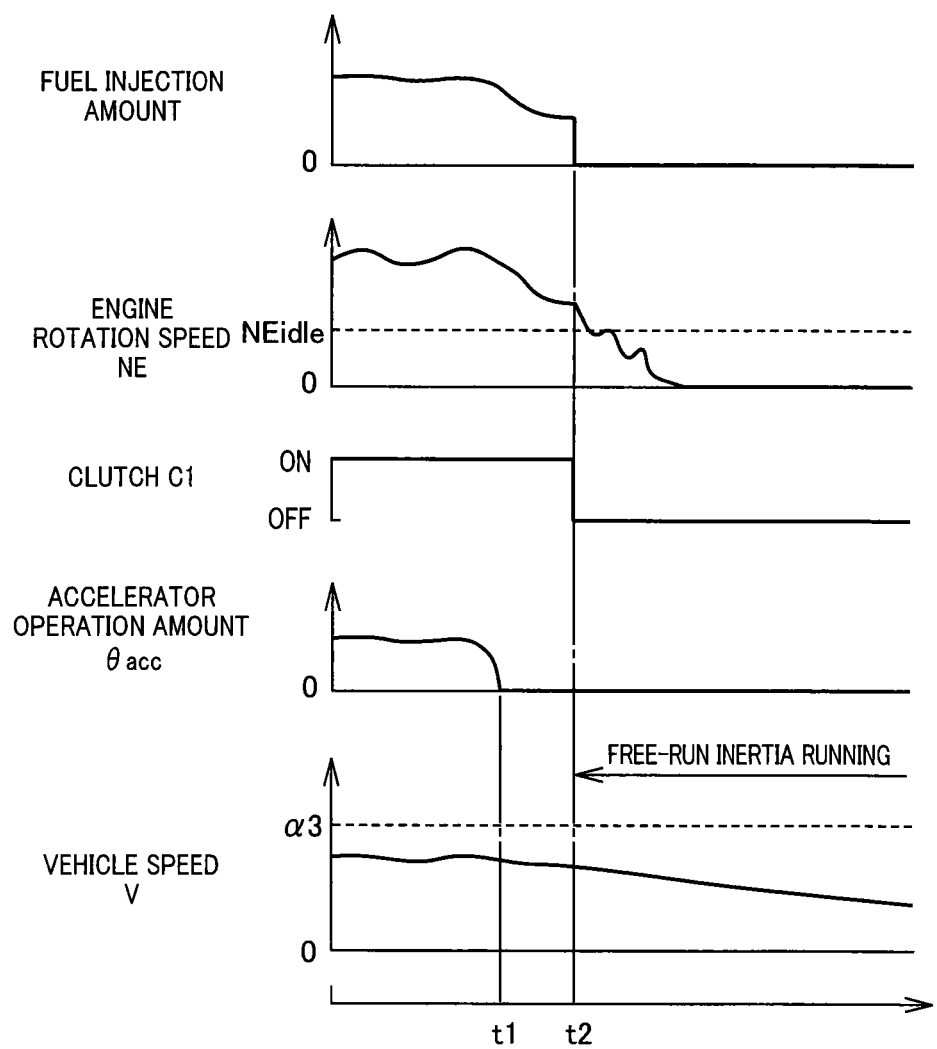
FIG. 16 is an example of a time chart indicative of changes in an operation state of portions when the free-run inertia running mode is performed in accordance with the flow chart of FIG. 15.

FIG. 16 is an example of a time chart of changes in operation states of the portions when the inertia running mode is performed in accordance with the flowchart of FIG. 15 and may correspond to any of the cases of (a) to (c) of FIG. 14. In FIG. 16 depicting the case that the free-run inertia running mode is performed when the vehicle speed V is equal to or less than the first determination value α3, time t1 is the time of accelerator-off and, after a certain time has elapsed (at time t2), the clutch C1 is released (OFF) and a fuel cut is performed to start the execution of the free-run inertia running mode.

Figure 17:
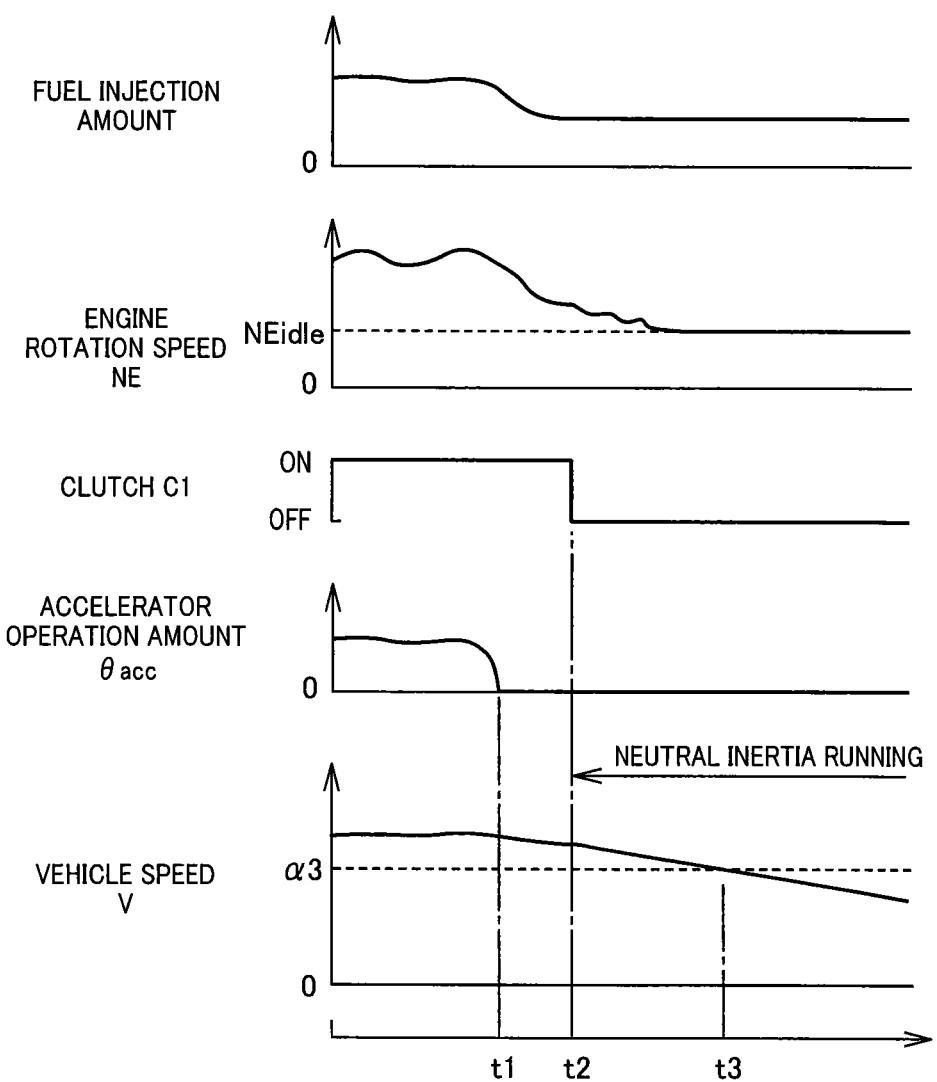
FIG. 17 is an example of a time chart indicative of changes in an operation state of portions when the neutral inertia running mode is performed in accordance with the flow chart of FIG. 15.

FIG. 17 depicts the case that the neutral inertia running mode is performed when the vehicle speed V is larger than the first determination value α3, and may correspond to the cases of (b) and (c) of FIG. 14. Time t1 is the time of accelerator-off and, after a certain time has elapsed (at time t2), the clutch C1 is released (OFF) and the engine 12 is controlled to be in the idling state so as to start the execution of the neutral inertia running mode. Subsequently, the vehicle speed V becomes equal to or less than the first determination value α3 at time t3 and, in the case of this example, the determination of step Q3 becomes NO to continue the neutral inertia running mode without change.

As described above, although this example is different from the example in that the necessity of the negative pressure is determined based on the vehicle speed V, the execution of the free-run inertia running mode performed with the rotation of the engine 12 stopped to acquire the excellent fuel consumption efficiency is started when the vehicle speed V is equal to or less than the first determination value α3 and the necessity of the negative pressure is low, while the execution of the neutral inertia running mode performed with the engine 12 kept rotating to properly acquire the amplification effect on the brake operation force Brk by the brake booster 42 is started when the vehicle speed V exceeds the first determination value α3 and the necessity of the negative pressure is relatively high, and therefore, as compared to the case of performing only any one of the free-run inertia running mode and the neutral inertia running mode, the overall fuel consumption can further be improved while properly ensuring the amplification effect on the brake operation force Brk, resulting in the acquisition of the same effect as the example.

On the other hand, although the neutral inertia running mode is performed as the second inertia running mode in the example, the cylinder resting inertia running mode may be performed instead of the neutral inertia running mode as depicted in FIG. 18. In particular, a cylinder resting inertia running means is disposed instead of the neutral inertia running means 56 to perform the cylinder resting inertia running mode. In the cylinder resting inertia running mode, the fuel supply to the engine 12 is stopped (a fuel cut F/C is performed) while the engagement state of the clutch C1 is maintained with the engine 12 and the wheels 20 coupled, and the cylinder resting device of the engine control device 30 stops the intake/exhaust valves in some (e.g., half) of multiple cylinders all at the positions where the valves are in the closed valve state. As a result, the running distance of the inertia running mode is extended and the fuel consumption is improved. Since only some of the multiple cylinders are rested and the remaining cylinders have the intake/exhaust valves opened and closed in synchronization with the crankshaft, the negative pressure is supplied to the brake booster 42 due to the pumping action of these cylinders and the amplification effect on the brake operation force Brk is acquired.

As compared to the neutral inertia running mode, therefore, the engine brake force is large and the running distance of the inertia running mode is relatively short; however, since the engine 12 is simply driven to rotate due to the fuel cut, the efficiency of the fuel consumption is at a comparable level with, or equal to or greater than, that of the neutral inertia running mode. Since only some cylinders are rested and the remaining cylinders generate a negative pressure from the pumping action, the amplification effect on the brake operation force Brk by the brake booster 42 is acquired as is the case with the neutral inertia running mode. As a result, even when the cylinder resting inertia running mode is performed instead of the neutral inertia running mode in the example, the same effect as the example is acquired. In this case, if a shift is made from the free-run inertia running mode to the cylinder resting inertia running mode, the clutch C1 may be engaged so that the engine 12 is driven to rotate and the intake/exhaust valves in some of the cylinders may be stopped at the closed valve positions by the cylinder resting device. In the case of returning from the cylinder resting inertia running mode to the engine brake running mode, the intake/exhaust valves stopped by the cylinder resting device may be released such that the intake/exhaust valves are coupled to the crankshaft and driven to open/close.

The execution condition for performing the cylinder resting inertia running mode and the first determination values α1 to α3 and the second determination values β1, β2 related to the necessity of the negative pressure (the inter-vehicle distance X, the down-gradient Φdn, and the vehicle speed V) for starting the execution of the cylinder resting inertia running mode may be the same as the examples, or may be set to different values. The neutral inertia running mode and the cylinder resting inertia running mode may be performed as the second inertia running mode in the individual cases.

Although the examples of the present invention have been described in detail with reference to the drawings, these examples are merely an embodiment and the present invention can be implemented in variously modified and improved forms based on the knowledge of those skilled in the art.

NOMENCLATURE OF ELEMENTS

10: vehicle drive device 12: engine 20: wheels 42: brake booster 46: negative pressure tank 50: electronic control device 52: engine brake running means 54: free-run inertia running means (first inertia running) 56: neutral inertia running means (second inertia running) 58: running mode switching control means 59: negative pressure necessity determination means (prediction means) 66: vehicle speed sensor 68: inter-vehicle distance sensor 70: road gradient sensor X: inter-vehicle distance Φdn: down-gradient V: vehicle speed PB: brake negative α1, α2, α3: first determination value β1, β2: second determination value

The invention claimed is:

1. A running control device of a vehicle including an engine and a brake booster amplifying a brake force by forming a negative pressure in a negative pressure tank by rotation of the engine, the running control device comprising:
circuitry configured to:
execute an engine brake running mode performed with the engine coupled to wheels such that an engine brake is applied by driven rotation of the engine and an inertia running mode performed with an engine brake force made lower than that of the engine brake running mode, execute a first inertia running mode performed with the rotation of the engine stopped and a second inertia running mode performed with the engine kept rotating as the inertia running mode in accordance with predefined respective execution conditions, predict with a prediction portion a necessity of the negative pressure formed in the negative pressure tank by rotation of the engine, the necessity of the negative pressure being included in a condition for starting of each of the first inertia running mode and the second inertia running mode, wherein the first inertia running mode is started on the condition that the necessity of the negative pressure is equal to or less than a predefined first determination value, wherein the second inertia running mode is started when the necessity of the negative pressure is equal to or less than a predefined second determination value higher than the first determination value, and wherein the engine brake running mode is executed when the necessity of the negative pressure is larger than the second determination value.

2. The running control device of a vehicle of claim 1, wherein the prediction portion predicts the necessity of the negative pressure based on at least one of an inter-vehicle distance to a preceding vehicle, a road gradient, and a vehicle speed, wherein when the necessity is predicted based on the inter-vehicle distance, the necessity of the negative pressure is higher when the inter-vehicle distance is shorter, wherein when the necessity is predicted based on the road gradient, the necessity of the negative pressure is higher when the down-slope of the road surface is larger, and wherein when the necessity is predicted based on the vehicle speed, the necessity of the negative pressure is higher when the vehicle speed is higher.

3. The running control device of a vehicle of claim 1, wherein the second inertia running mode is started when the necessity of the negative pressure is in a region exceeding the first determination value and equal to or less than the second determination value.

4. The running control device of a vehicle of claim 1, wherein the second inertia running mode is started when the necessity of the negative pressure is in a region equal to or less than the second determination value including a region equal to or less than the first determination value.

5. The running control device of a vehicle of claim 1, wherein the first inertia running mode is a free-run inertia running mode in which the engine is separated from the wheels with fuel supply to the engine stopped to stop rotation of the engine, and wherein the second inertia running mode is a neutral inertia running mode in which fuel is supplied to operate the engine while the engine is separated from the wheels.

6. The running control device of a vehicle of claim 1, wherein the first inertia running mode is a free-run inertia running mode in which the engine is separated from the wheels with fuel supply to the engine stopped to stop rotation of the engine, and wherein the second inertia running mode is a cylinder resting inertia running mode in which fuel supply to the engine is stopped with the engine coupled to the wheels while operation of a piston and intake/exhaust valves of at least one of multiple cylinders of the engine is stopped.

7. The running control device of a vehicle of claim wherein one of the first inertia running mode and the second inertia running mode is selected to start thereof in an overlapping region equal to or less than the first determination value.

* * * * *